US009578290B2

(12) United States Patent
Isaji

(10) Patent No.: US 9,578,290 B2
(45) Date of Patent: Feb. 21, 2017

(54) VIDEO DATA REPRODUCTION SYSTEM

(75) Inventor: Yutaka Isaji, Kobe (JP)

(73) Assignee: GVBB HOLDINGS S.A.R.L., Luxembourg (LU)

(*) Notice: Subject to any disclaimer, the term of this patent is extended or adjusted under 35 U.S.C. 154(b) by 523 days.

(21) Appl. No.: 12/733,076

(22) PCT Filed: Aug. 9, 2007

(86) PCT No.: PCT/JP2007/000859
§ 371 (c)(1),
(2), (4) Date: Feb. 8, 2010

(87) PCT Pub. No.: WO2009/019739
PCT Pub. Date: Feb. 12, 2009

(65) Prior Publication Data
US 2010/0142917 A1  Jun. 10, 2010

(51) Int. Cl.
*H04N 5/783* (2006.01)
*H04N 7/173* (2011.01)
(Continued)

(52) U.S. Cl.
CPC .......... *H04N 7/17336* (2013.01); *H04N 5/783* (2013.01); *H04N 19/132* (2014.11);
(Continued)

(58) Field of Classification Search
CPC ........ H04N 5/783; H04N 9/8042; H04N 5/85; H04N 5/781; H04N 21/4325; H04N 5/765; G11B 27/005; G11B 2220/90; G11B 27/105; G11B 2220/20; G11B 27/11; G11B 27/329; G11B 21/083; G11B 21/055
(Continued)

(56) References Cited

U.S. PATENT DOCUMENTS 5,758,085 A * 5/1998 Kouoheris et al. ........... 709/231
5,771,335 A   6/1998 Lee
(Continued)

FOREIGN PATENT DOCUMENTS

EP    2186340       5/2010
JP    H06-133262 A  5/1994
(Continued)

OTHER PUBLICATIONS

Search Report Dated Sep. 28, 2007.
(Continued)

*Primary Examiner* — Nigar Chowdhury
(74) *Attorney, Agent, or Firm* — Arent Fox LLP

(57) ABSTRACT

A transmission server reads out encoded data files from storage medium such as memory in itself and removable medium, and transmits the read-out file to the reproduction apparatus upon the request from the reproduction apparatus. A plurality of encoded video files are corresponding to an AV content. These encoded data files correspond to different reproduction modes respectively. The transmission server transmits an encoded file to the reproduction apparatus which corresponds to the requested AV content and the requested reproduction mode. Further, the transmission server switches files to be transmitted based upon a mode switching request from the reproduction apparatus. In other words, the file to be transmitted is switched from an encoded file corresponding to a pre-request reproduction mode to another corresponding to a post-request reproduction mode.

32 Claims, 17 Drawing Sheets

(51) Int. Cl.

| | | |
|---|---|---|
| *H04N 21/234* | (2011.01) | |
| *H04N 21/2343* | (2011.01) | |
| *H04N 21/44* | (2011.01) | |
| *H04N 19/159* | (2014.01) | |
| *H04N 19/172* | (2014.01) | |
| *H04N 19/61* | (2014.01) | |
| *H04N 19/132* | (2014.01) | |
| H04N 5/765 | (2006.01) | |
| H04N 5/781 | (2006.01) | |
| H04N 9/804 | (2006.01) | |

(52) U.S. Cl.
CPC ......... *H04N 19/159* (2014.11); *H04N 19/172* (2014.11); *H04N 19/61* (2014.11); *H04N 21/23424* (2013.01); *H04N 21/23439* (2013.01); *H04N 21/234381* (2013.01); *H04N 21/44016* (2013.01); *H04N 5/765* (2013.01); *H04N 5/781* (2013.01); *H04N 9/8042* (2013.01)

(58) Field of Classification Search
USPC ................................. 386/328–334, 343–357
See application file for complete search history.

(56) References Cited

U.S. PATENT DOCUMENTS

| | | | |
|---|---|---|---|
| 5,867,625 A | 2/1999 | McLaren | |
| 5,920,529 A * | 7/1999 | Ota et al. .................. | 369/84 |
| 6,724,978 B2 * | 4/2004 | Van Gestel et al. .......... | 386/330 |
| 6,865,747 B1 * | 3/2005 | Mercier .......... G11B 20/00086 | |
| | | | 348/E5.007 |
| 6,909,837 B1 * | 6/2005 | Unger ..................... H04N 5/76 | |
| | | | 386/205 |
| 2002/0044761 A1 | 4/2002 | Takashima et al. | |
| 2003/0113026 A1 * | 6/2003 | Srinivasan .......... H04N 19/105 | |
| | | | 382/239 |
| 2003/0231863 A1 * | 12/2003 | Eerenberg et al. ............ | 386/68 |
| 2005/0097614 A1 * | 5/2005 | Pedlow et al. .................. | 725/90 |
| 2006/0117357 A1 * | 6/2006 | Surline .......................... | 725/90 |
| 2006/0171666 A1 * | 8/2006 | Im ................................. | 386/68 |
| 2007/0140647 A1 * | 6/2007 | Kusunoki et al. ............. | 386/68 |
| 2008/0273698 A1 * | 11/2008 | Manders ................ H04N 5/783 | |
| | | | 380/200 |
| 2008/0317246 A1 * | 12/2008 | Manders ................ H04N 5/783 | |
| | | | 380/37 |

FOREIGN PATENT DOCUMENTS

| | | |
|---|---|---|
| JP | 8-154230 A | 6/1996 |
| JP | 09-186967 A | 7/1997 |
| JP | H11-155129 A | 6/1999 |
| JP | 2002-77815 A | 3/2002 |
| WO | 0033567 | 6/2000 |
| WO | WO 00/33567 | 6/2000 |
| WO | 0195624 A1 | 12/2001 |
| WO | WO 01/95624 | 12/2001 |
| WO | 2009019739 A1 | 2/2009 |

OTHER PUBLICATIONS

Office Action in Japanese Application No. 2010-504977 mailed Aug. 14, 2012.
English abstract of Japanese Patent Publication No. 8-154230 published Jun. 11, 1996.
Notice of Reasons for Rejection transmitted on Jan. 24, 2012 in JP Patent Application 2010-504977 (with English translation).
European Patent Office International Preliminary Examination Report(EPO) Appln. No. 07-790-347.4-1902, WIPO Munich Germany; Feb. 21, 2013.
International Preliminary Report on Patentability and Written Opinion of the International Searching Authority—PCT/JP2007/000859; European Patent Office—Munich Germany Aug. 9. 2007.
EP Communication dated Jan. 30, 2015, regarding EP07790347.4.
Publication No. WO2009019739A1, dated Feb. 12, 2009, and International Search Report dated Sep. 28, 2007, regarding PCT/JP2007/000859.

\* cited by examiner

Fig. 7A

| STREAM ID |
|---|
| ORIGINAL FILE NAME |
| FAST-FORWARD FILE NAME |

Fig. 7B

| GOP NUMBER | DISPLAY NUMBER | ORIGINAL FILE ADDRESS | FAST-FORWARD FILE ADDRESS |
|---|---|---|---|
| 1 | 2 | 0000 | 0000 |
| 2 | 2 | 0012 | 0009 |
| 3 | 2 | 0024 | 0018 |
| ⋮ | ⋮ | ⋮ | ⋮ |

VIDEO DATA REPRODUCTION SYSTEM

This application claims the benefit, under 35 U.S.C. §365 of International Application PCT/JP2007/000859, filed Aug. 9, 2007, which was published in accordance with PCT Article 21(2) on Feb. 12, 2009 in English.

TECHNICAL FIELD

The present invention relates to switching from a normal mode to a trick mode and vice versa during the reproduction of encoded video data.

BACKGROUND ART

A fast-forward mode or a reverse mode is known as a trick mode among reproduction modes of digital video data. The Patent Citations 1 and 2 disclose techniques which provide higher quality images using the trick mode reproduction process.

The Patent Citation 1 discloses a method whereby separate trick play data that is only for reproduction in a fast-forward mode and in a fast-reverse mode is prepared in addition to normal play data to enable the switching of signals to be read-out depending on the reproduction modes requested from a terminal. The trick play data for fast-forward reproduction at n-times play speed has frame numbers of 1, n+1, 2n+1 .... Such a method enables a quick switch from a normal mode to a trick mode and vice versa, and, shortens the time for reading-out the data.

The Patent Citation 2 discloses an apparatus for reproducing encoded video data utilizing the Motion Picture Coding Experts Group (MPEG) video compression protocol. This apparatus reproduces encoded video data in a fast-forward mode at n-times play speed by only decoding I-pictures and P-pictures when the frame interval of anchor frames is n (n=2, 3). This apparatus also performs fast-forward playback at twice the play speed by outputting the same frame twice for every two frames when the frame interval of the anchor frames equals three. The frame interval of the anchor frames is a frame interval between I-picture and P-picture or a frame interval between P-pictures.
Patent Citation 1: Patent H06-133262
Patent Citation 2: Patent H11-155129

DISCLOSURE OF INVENTION

Technical Problem

A problem occurs when using the process for controlling trick play described in Patent Citation 1. The method of Patent Citation 1 removes frames at a regular frame interval and decodes the remaining frames as sequential frames. Therefore, the application of this method to encoded video data utilizing inter-frame compression is difficult.

The reproduction apparatus described in Patent Citation 2 can reproduce encoded video data utilizing inter-frame compression. However, this apparatus reproduces I-pictures and P-pictures only. Therefore, the reproduction apparatus outputs the same frame repeatedly when outputting anchor frames in display order causing the reproduction at a speed that is faster than a desired speed. For example, this can occur when a frame interval of anchor frames is three and twice the play speed is desired for reproduction in a fast-forward mode. In this case, a display control is required at the reproduction apparatus so that it repeatedly outputs the same frame once every two frames. Thus, a conventional MPEG decoder cannot be employed since in order to enable the display control, a M signal indicating the frame interval of anchor frames must be provided by a decoder with a display control unit. Moreover, the process of repeatedly outputting the same frame deteriorates image quality at fast-forward playback.

In addition, transmission of an encoded video data stream from a server to the reproduction apparatus adds an extra burden on a network in order to facilitate reproduction at n-times play speed because the steps of skipping B-pictures and selectively decoding I- and P-pictures require all encoded frames, including B-pictures, to be downloaded from the server to the reproduction apparatus over the network and executed at the end of the reproduction apparatus. Accordingly, it is necessary to transmit the encoded video data at n-times speed over the network in order to achieve reproduction in a fast-forward mode at n-times play speed on the reproduction apparatus.

The object of the present invention therefore, is to provide an apparatus for reproducing encoded video data utilizing inter-frame compression capable of producing smoother trick play performance. Another object of the present invention is to avoid placing additional load on a network when transmitting an encoded video data stream in order to achieve a trick play operation.

Technical Solution

A first aspect according to the present invention provides a video data reproduction system that includes a source, an output node, a providing unit, and a switching unit. The source is of first and second video data derived from a same video data. The providing unit is configured to provide sequentially the first and the second video data to said output node, and coupled between said source and said output node. The switching unit is configured to switch data between the first and the second video data in response to a control signal, and coupled to said providing unit.

Data to be output are switched from the first video data to the second video data or vice versa.

The first video data preferably include intra frames and non-intra frames. The intra frames are decoded independently and the non-intra frames are decoded by referencing preceding and/or subsequent frames. The second video data includes at least the intra frames in the first video data.

The switching unit may further specify next data to be read-out next to the data being currently read-out in response to the control signal. In addition, the switching unit may set switching positions to an intra frame in the current data and another intra frame in the next data which is identical to the intra frame in the current data.

The switching unit may set the switching positions to the first intra frame in the current data that is read-out after the control signal.

The first video data is preferably for reproduction in a normal mode, and the second video data is preferably for reproduction in a fast-forward mode.

The address storage unit may be configured to store a relation table which correlatively stores addresses of the intra frames in the first and second video data. The switching unit refers to the relation table and determines a read-out address from which the next data is read-out.

Another aspect according to the present invention provides a video data reproduction system that includes a storing means, an output means, a providing means, and a switching means. The storing means stores first and second video data derived from a same video data. The providing means provides sequentially the first and the second video data to said output means, and is coupled between said storing means and said output means. The switching means switches data between the first and the second video data in response to a control signal, and is coupled to said providing means.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

FIG. 7A shows a conceptual view of a stream table.

FIG. 7B shows a conceptual view of an offset table.

BEST MODE FOR CARRYING OUT THE INVENTION

The First Embodiment
The Overview of the Present Invention

Figure 1:
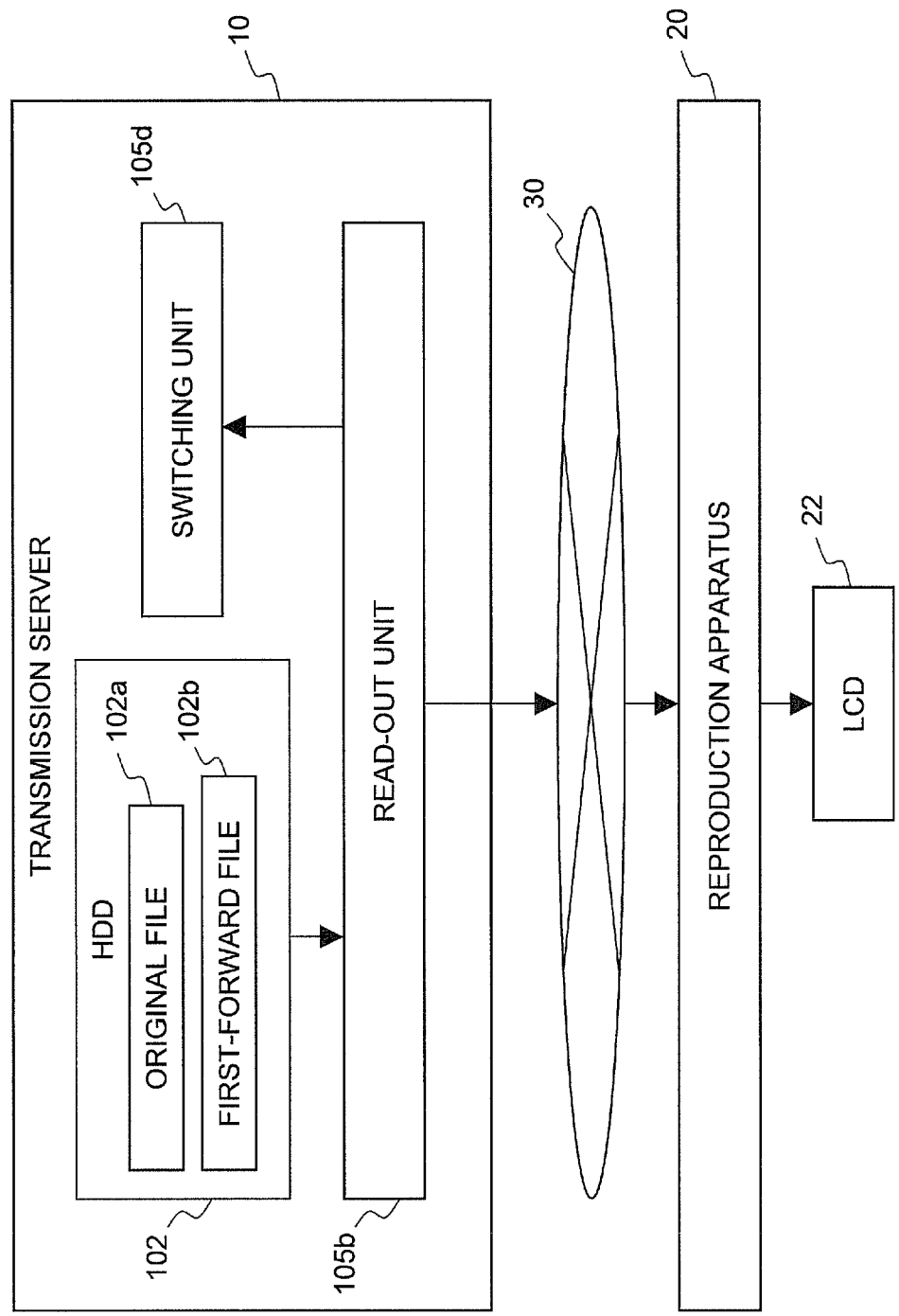
FIG. 1 is a simplified block diagram of a reproduction system in the first embodiment of the present invention.

FIG. 1 illustrates a simplified block diagram of a reproduction system 100 in the first embodiment of the present invention. The reproduction system 100 includes a transmission server 10 and a reproduction apparatus 20. The transmission server 10 and the reproduction apparatus 20 are connected via a network 30 and communicate with each other.

The transmission server 10 reads out encoded video data files recorded on a storage medium and transmits a video data stream upon a request from the reproduction apparatus 20. The storage medium may be memory on the transmission server 10 itself or a removable storage medium. Each AV content corresponds to a plurality of encoded video data files generated for different reproduction modes. The transmission server 10 transmits an encoded video data file corresponding to a requested AV content and a requested reproduction mode to the reproduction apparatus 20. In addition, the transmission server 10 switches encoded video data files to be read-out upon a mode switching request from the reproduction apparatus 20. In other words, the transmission server 10 switches a file corresponding to pre-request reproduction mode to a file corresponding to post-request reproduction mode.

A plurality of encoded video data files corresponding to an AV content includes an original encoded data file for normal mode at n=1 (hereinafter, an "original file") and at least one encoded data file for trick-play mode at n- (n=1 or n>1) times play speed (hereinafter, a "trick-play file"). An original file is generated by utilizing a conventional inter-frame compression such as MPEG 2 or MPEG 4. To simplify the following explanation, an original file compressed by MPEG 2 will be used as an example in this embodiment. The trick-play file may be an encoded data file for fast-forward reproduction at n- (n>1) times play speed. The trick-play file may also be an encoded data file for reverse reproduction at n-(n=1) times play speed. A fast-forward file is derived from an original file by removing part of the frames in the original file. Accordingly, the data amount of the fast-forward file is reduced than that of the original file. Therefore, the reproduction apparatus 20 performs reproduction in a fast-forward mode without increasing the read-out speed or the transmission speed of the fast-forward data on the network 30 when the transmission server 10 transmits an encoded video data stream to the reproduction apparatus 20. The term "frame" as used herein refers to the encoded data that can be used to represent an image, and generally corresponds to a picture in MPEG protocol.

Hardware Configuration
(1) Transmission Server

Figure 2:
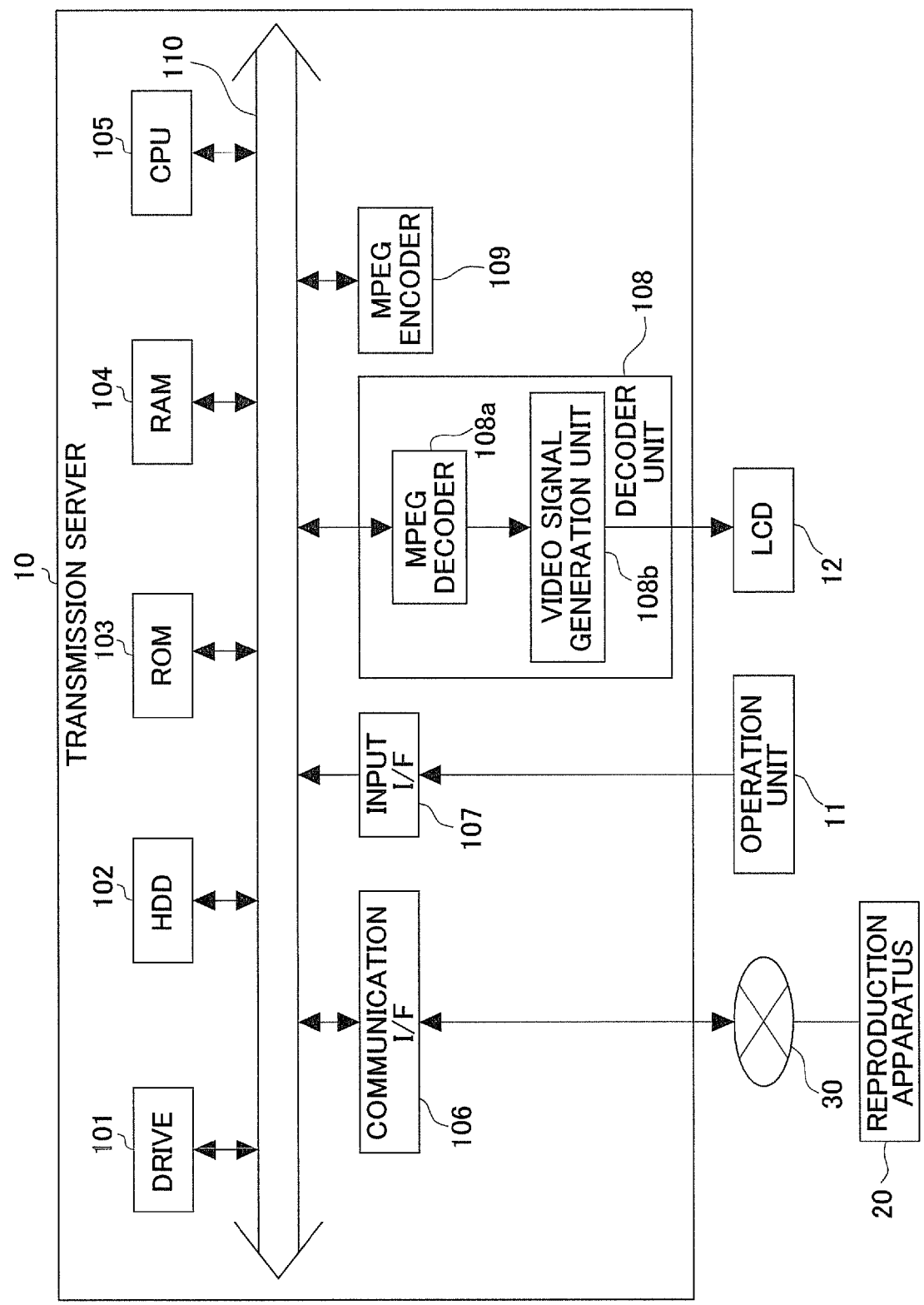
FIG. 2 shows a simplified block diagram of a hardware structure of a transmission server in FIG. 1.

FIG. 2 shows an example of a hardware diagram of the transmission server 10. The transmission server 10 can be configured by a computer. The transmission server 10 includes a drive 101, a hard disk drive (HDD) 102, a ROM 103, a RAM 104, a CPU 105, a communication interface (I/F) 106, an input interface 107, a decoder unit 108, a MPEG encoder 109, and a BUS 110 that connects the above-mentioned elements. In addition to these elements, the transmission server 10 may further include an AV unit (not shown) which obtains analog AV data from outside and converts such analog AV data into digital AV data.

The drive 101 reads out encoded video data files from a removable storage medium. The removable storage medium may include, for example, an optical disk, a magnetic disk, an optical-magnetic disk, a Blu-ray disk, or a semiconductor memory. The drive 101 is an optional element for the transmission server 10. The drive 101, however, enables the transmission server 10 to read-out encoded video data files recorded on the removable storage medium.

The HDD 102 correlatively stores a plurality of encoded video data files and a plurality of voice data files for each AV content. Each encoded video data file and each voice data file correspond to a reproduction mode at a certain play speed. In this embodiment, reproduction is performed either in a normal mode or a fast-forward mode.

The ROM 103 stores control programs and data necessary for executing a control program.

The RAM 104 temporarily stores the data necessary for executing the control program.

The CPU 105 manages the entire operation of the transmission server 10 by executing the control program stored in the ROM 103 or HDD 102 on a volatile memory such as the RAM 104. For example, the CPU 105 manages the drive 101 so as to read-out an original file from a removable disk and write the file onto the HDD 102.

The communication interface 106 transmits data to and receives data from the reproduction apparatus 20 via the network 30. The data sent to and from the reproduction apparatus 20 includes at least the encoded video data files, and may further include a non-compressed video data file from a resource on the network 30.

The input interface 107 accepts a user operation on an operation unit 11 such as a keyboard and/or a mouse. An operation signal is provided to the CPU 105 via the BUS 110. The input interface 107 is not an essential element of the transmission server 10 of the present invention.

The decoder unit 108 includes an MPEG decoder 108a and a video signal generation unit 108b. The decoder unit 108 is an optional element for the transmission server 10. The decoder unit 108, however, enables the transmission server 10 to decode an encoded video data file. The MPEG decoder 108a decodes MPEG encoded data provided through the BUS 110 according to a command from the CPU 105, and generates digital video data. The digital video data is then provided to the video signal generation unit 108b. The video signal generation unit 108b converts the digital video data into display data so that the display data can correspond with the number of pixels of a liquid crystal display (LCD) 12. The generated display data is then outputted to the LCD 12 by a LCD driver (not shown).

The MPEG encoder 109 encodes low-compression or non-compression digital video data into MPEG format data according to a command from the CPU 105. The generated encoded data is stored in the HDD 102 via the BUS 110. The MPEG encoder 109 is an optional element for the transmission server 10 and may be set outside of the transmission server 10.

(2) Reproduction Apparatus

Figure 3:
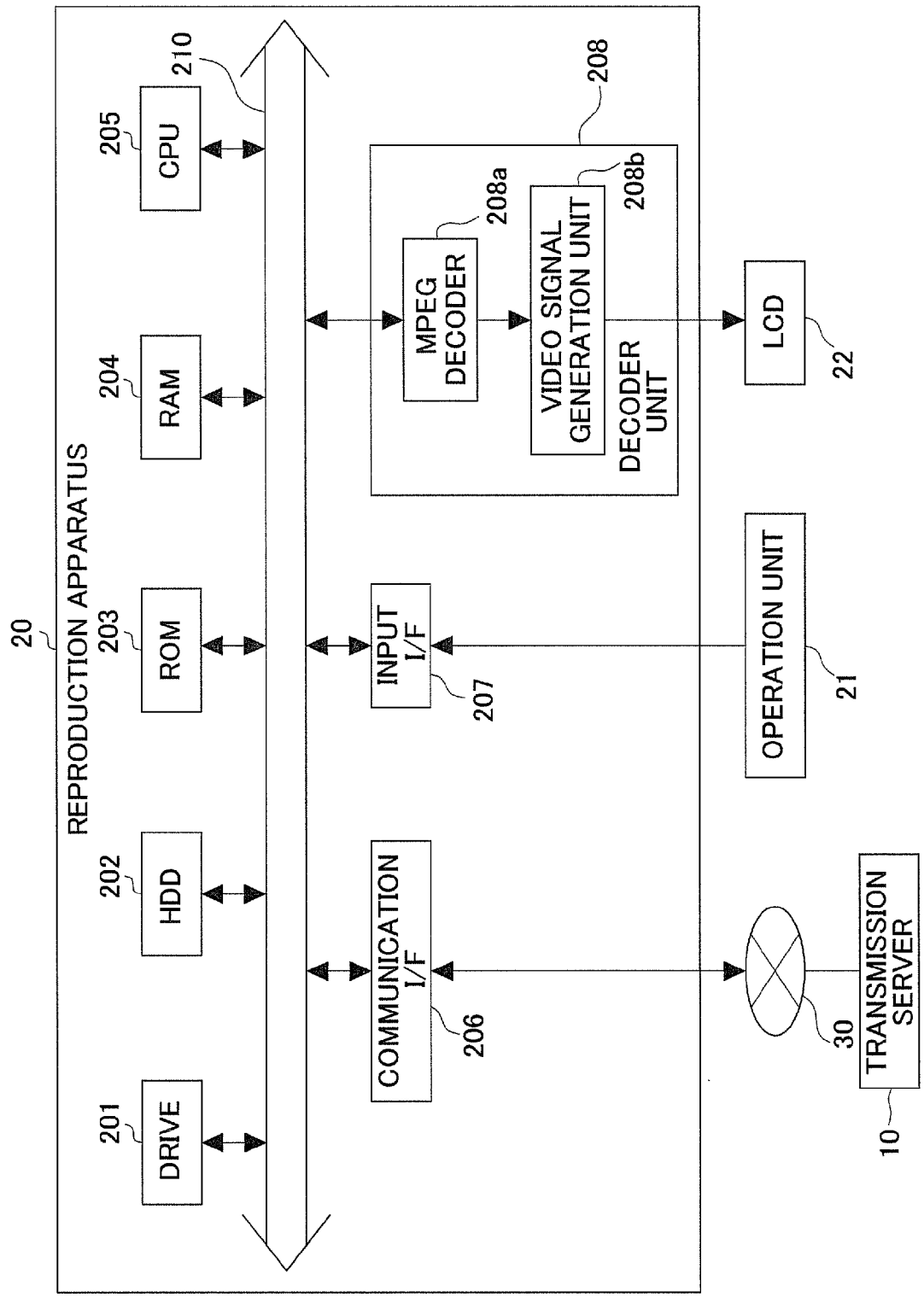
FIG. 3 shows a simplified block diagram of a hardware structure of a reproduction apparatus in FIG. 1.

FIG. 3 shows a hardware block diagram of the reproduction apparatus 20 in FIG. 1. In this embodiment, the reproduction apparatus 20 includes a drive 201, a HDD 202, a ROM 203, a RAM 204, a CPU 205, a communication interface 206, an input interface 207, a decoder unit 208, a MPEG encoder 209, and a BUS 120 that connect the above mentioned elements.

The drive 201 reads out encoded data files from a removable storage medium such as an optical disk. The removable medium has correlatively recorded thereon encoded video data files and voice data files for an AV content. In this embodiment, the drive 201 is an optional element for the reproduction apparatus 20. The drive 201, however, enables the reproduction apparatus 20 to read-out encoded video data recorded on a removable medium for reproduction.

The HDD 202 correlatively stores a plurality of encoded video data files and voice data files for an AV content. Each encoded video data file and each voice data file correspond to a reproduction mode at a certain play speed. In this embodiment, the HDD 202 is an optional element for the reproduction apparatus 20. The HDD 202, however, enables the reproduction apparatus 20 to record an encoded video data read-out from the drive 201 or received from the transmission server 10 onto the HDD 202 so as to perform reproduction.

The ROM 203 stores a control program and data necessary for executing a control program.

The RAM 204 temporarily stores the data necessary for executing the control program.

The CPU 205 executes the control program stored in the ROM 203 on a volatile memory such as the RAM 204, and manages the entire operation of the reproduction apparatus 20. For example, the CPU 205 manages the communication interface 206 so that it receives an encoded video data stream from the transmission server 10, and outputs the stream to the decoder unit 208 via the BUS 201.

The communication interface 206 sends and receives the data to and from the transmission server 10 via the network 30. For example, the communication interface 206 receives an encoded video data stream from and sends an operation signal by a user input to the transmission server 10.

The input interface 207 accepts a user operation on an operation unit 21 such as a keyboard and/or a mouse. An operation signal is output to the CPU 205 via BUS 210.

The decoder unit 208 includes an MPEG decoder 208a and a video signal generation unit 208b. The MPEG decoder 208a decodes MPEG format encoded data that is input through the BUS 210 in response to a command from the CPU 205, and generates digital video data. The digital video data is provided to the video signal generation unit 208b. The video signal generation 208b converts the digital video data into display data so that the display data can correspond with the number of pixels of a LCD 22. The generated display data is then output to the LDC 22 by a LCD driver (not shown).

Functional Configuration

<1> Function Configuration of the Transmission Server

Figure 4:
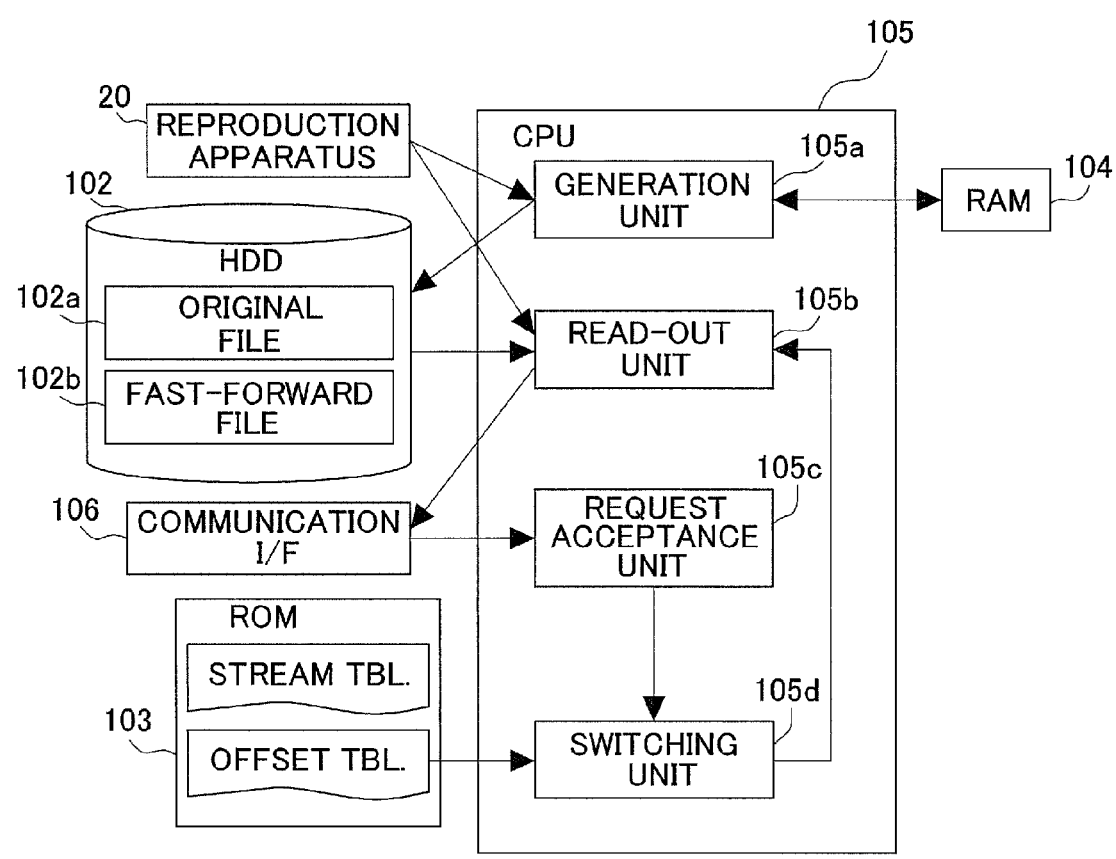
FIG. 4 shows a simplified block diagram of a functional structure of the transmission server in FIG. 1.

FIG. 4 shows a block diagram of a functional configuration of the transmission server 10. The CPU 105 in the transmission server 10 enables the transmission server 10 to operate as a generation unit 105a, a read-out unit 105b, a request acceptance unit 105c (a "change acceptance unit" in the claims), and a switching unit 105d (a "data switching unit" in the claims). The process of transmitting the trick play data by server 10 to the reproduction apparatus 20 will be explained first, and then, the tables stored in the transmission server 10, and finally, each function of the transmission server 10.

<1-1> An Original File and a Fast-Forward File

FIG. 5(A) is an explanatory view of an original file. FIG. 5(B) is an explanatory view of a fast-forward file which is derived from the original file illustrated in FIG. 5A. FIGS. 5(A) and (B) also illustrate how to generate a fast-forward file based on an original file. These files are recorded on a storage medium such as a removable storage medium or a hard disk.

The original file is for reproduction in a normal mode at n-(n=1) times play speed and is generated by inter-frame compression of an AV data which is compressed at low-compression rate or is non-compression data. Examples of inter frame compression technique include MPEG 2 and MPEG 4. In this embodiment, as mentioned previously, an original file is an inter-frame MPEG-compressed data file which includes I-pictures, B-pictures, and P-pictures. An I-picture can be decoded independently, whereas a B-picture is encoded by making reference to preceding and/or subsequent pictures. A P-picture is encoded by making a reference only to preceding pictures and can therefore be decoded by making a reference to preceding pictures only. P-pictures and B-pictures in a GOP (group of pictures) may refer to another picture in another GOP (hereinafter an "open-GOP file"). On the contrary, P-pictures and B-pictures in a GOP may only refer to another picture in the same GOP (hereinafter a "closed-GOP file").

A fast-forward file is for a fast-forward playback at n-times speed (n>1) in a fast-forward mode. A plurality of fast-forward files can be generated for different play speeds. In this case, a file is read-out according to a designated reproduction mode and a designated play speed.

FIG. 5(A) shows an original file, and FIG. 5(B) shows a fast-forward file. Picture numbers that are illustrated in FIGS. 5(A) and (B) such as I1, B2, B3, P4 . . . are assigned to each picture and are serial numbers starting from "1" in each group of pictures and are in order of stream sequences. In other words, picture numbers indicating the order in each GOP show the order in which the pictures should be read-out, both encoded and decoded. Hence, each display number in FIGS. 5A and 5B indicates the order in a GOP in which each picture should be displayed.

The original file in FIG. 5(A) illustrates the picture numbers showing the order for the pictures to be read-out, picture types, and display numbers. Shadowed squares such as B2, B8 and B12 are the pictures to be removed, as further described below. The numbers "00000000" and "00013629" in FIG. 5(A) show relative addresses of each I-picture, which are addresses relative to the head of the original file.

The generation of the fast-forward file is illustrated in FIG. 5(B). The fast-forward file is generated by removing B2, B8 and B12-pictures from each GOP in the original file. Here, the number of pictures included in the GOP decreases from 12 to 9. Therefore, this fast-forward file facilitates reproduction in a fast-forward mode at about 1.3 times play speed even without increasing the speed of transmission over the network 30 for reading-out and decoding the data. The numbers "00000000" and "00010843" in FIG. 5(B) show the relative addresses of each I-picture that are relative to the head of the original file.

The relative address of an I1-picture, which is the address relative to the head of a file, is always "00000000" in every file. While the relative addresses of a corresponding I2-picture is "00013629" in the original file and "00010843" in the fast-forward file, the relative addresses of the corresponding I2-picture has two addresses, one that is relative to the head of the original file and the other that is relative to the head of the fast-forward file. Relative addresses of a corresponding I-picture included in different files are associated with each other in an offset table (FIG. 7) as further described below.

Some pictures in each GOP of the fast-forward file have different display numbers from those in the original file. This is because new display numbers are assigned to each picture in the fast-forward file so that the display numbers are consecutive numbers beginning with zero in each GOP.

For example, pictures with display numbers "1" to "5" in the original file correspond to the pictures with display numbers "0" to "4" in the fast-forward file. These pictures in the fast-forward file have display numbers that are one less than the display numbers in the original file. Likewise, the pictures of display numbers "7" to "9" in the original file correspond to the pictures of display number "5" to "7" in the fast-forward file. In this case, these pictures in the fast-forward file have smaller display numbers that are two less than the picture numbers in the original file. Likewise, the picture of display number "11" in the original file is corresponding to the picture of the display number "8" in the fast-forward file. This picture in the fast-forward file has a display number that is three less than the picture numbers in the original file.

FIG. 6(A) shows the same original file as in FIG. 5(A). FIG. 6(B) shows another fast-forward file derived from the original file illustrated in FIG. 6(A). This fast-forward file is generated by removing 4 pictures from each GOP having 12 pictures in the original file and thus, facilitates reproduction in a fast-forward mode at 1.5 times play speed. As mentioned previously, the relative addresses of the corresponding I-pictures are stored correlatively in an offset table, and the display order in each GOP is newly assigned in the fast-forward file.

Figure 5:
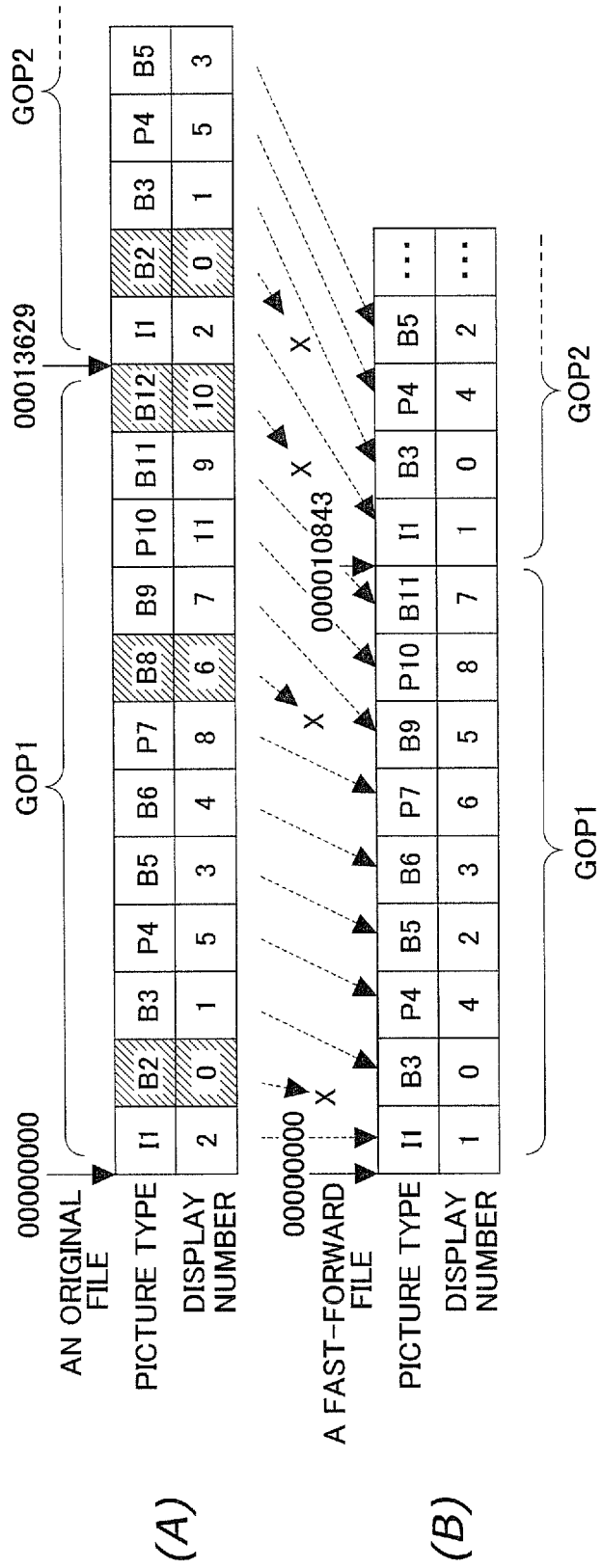
In FIG. 5, Fig. (A) shows an explanatory view of an original file, and Fig. (B) shows an explanatory view of a fast-forward file derived from the original file illustrated in Fig. (A).
Figure 6:
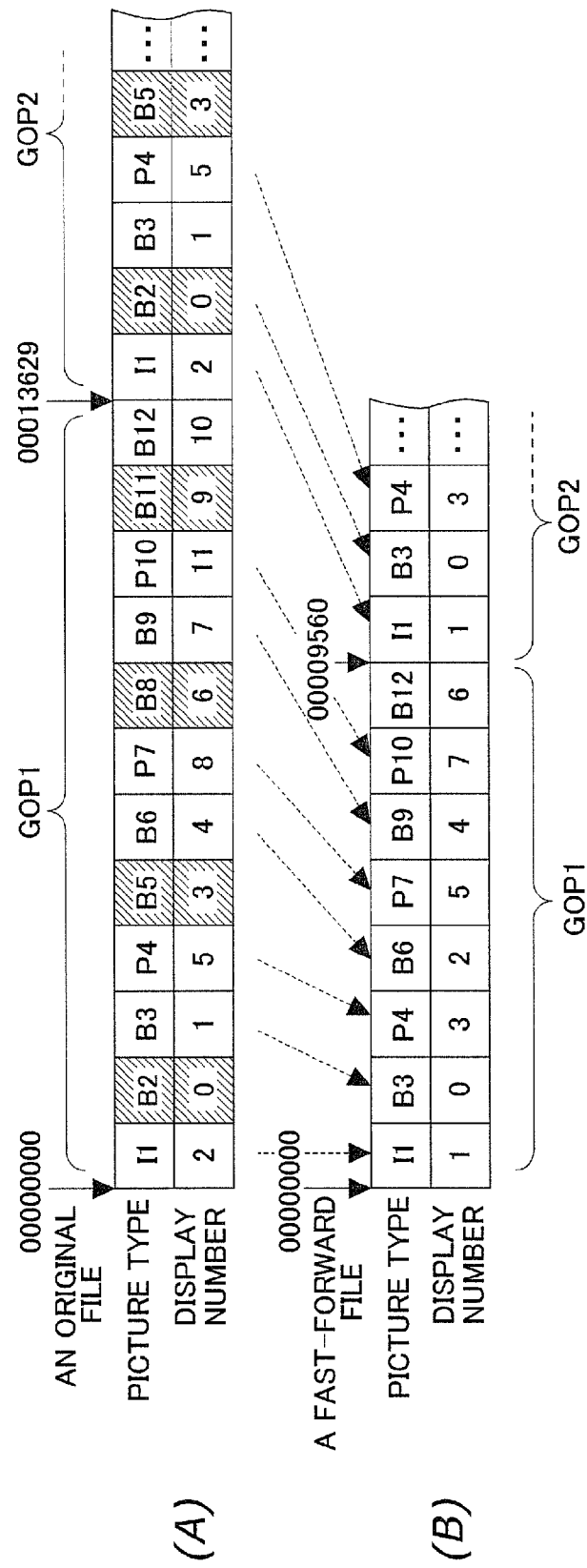
In FIG. 6, Fig. (A) shows another explanatory view of original file, and Fig. (B) shows another explanatory view of a fast-forward file derived from the original file illustrated in Fig. (A).

Only one fast-forward file appears to be generated from an original file in the above-mentioned FIG. 5 and FIG. 6. However, a plurality of fast-forward files for different trick play speeds can be generated from the one original file.

The above-mentioned fast-forward file can be decoded by a conventional MPEG decoder. Moreover, the data amount of the fast-forward file is less than the data amount of the original file. This is because the fast-forward file is generated by removing several pictures from the original file. Therefore, the fast-forward file facilitates reproduction in a fast-forward mode at n-times play speeds (n>1) without increasing the data transmission speed of the transmission server 10 or the network 30, or the reproduction speed at the reproduction apparatus 20 when being transmitted from the transmission server 10 to the reproduction apparatus 20.

<1-2> Tables

FIGS. 7A and 7B show a conceptual view of tables stored in the ROM 103 of the transmission server 10. FIG. 7A is a stream table, and FIG. 7 B is an offset table.

The stream table associates an original file with at least one fast-forward file which is generated based on the original file. These associated files correspond to the same AV content. In this embodiment, the stream table associates an original file with a fast-forward file.

The stream table correlatively stores a "stream ID", an "original file name" and a "fast-forward address". The "stream ID" indicates an identifier of an AV content. The "original file name" indicates the name of an original file. The "fast-forward file name" indicates the name of a fast-forward file.

The stream table can further associate play speeds with the above mentioned data. This enables the stream table to correlate a plurality of fast-forward files for different play speeds generated from the same original file. In this case, the stream table associates the head address of an original file, the head addresses of each fast-forward file and play speeds. In addition to play speeds, the stream table can associate a voice data file for n-times speed playback with a fast-forward file for n-times speed playback (not shown).

FIG. 7B is an offset table that associates the address of an I-picture in the original file with the address of a corresponding I-picture in a fast-forward file. In this embodiment, relative addresses, in other words, offset values, of each I-picture in each file are associated with each other in a record. More specifically, this offset table stores a "GOP number," a "display number," an "original file address," and a "fast-forward file address" in a record.

The "GOP number" specifies a GOP in each file and the "display number" indicates the display order in each GOP. The "display number" can be omitted when each GOP includes only one I-picture. The "display number" or other information is used to distinguish I-pictures in each GOP when a plurality of I-pictures is included in each GOP. The "original file address" indicates an address of an I-picture relative to the head of the original file. The "fast-forward file address" indicates an address of a corresponding I-picture relative to the head of the fast-forward file. The original file address and the fast-forward file address are an offset value relative to the head of each file.

The offset table of FIG. 7B facilitates a switching of read-out points from an I-picture address in a file to the corresponding I-picture address in another file.

<1-3> Functions (a) Generation Unit

The generation unit 105a generates a fast-forward file by removing pictures from the picture sequence of an original file to reduce the amount of data. The generated fast-forward file is recorded on a storage medium, such as a removable storage medium and the HDD 102, by the generation unit 105a. In this invention, to simplify the explanation, a case where the generated fast-forward file is recorded on the HDD 102 together along with the original file will be considered as follows. Although the generation unit 105a is an optional element for the transmission server 10, it nevertheless enables the transmission server 10 to generate a fast-forward file.

The removed pictures by the generation unit 105a are pictures other than ones which can be decoded independently. In other words, the generation unit 105a removes pictures other than I-pictures. In this embodiment, pictures to be removed from the original file are a part or all of B-pictures. The number of pictures to be removed "Ne" from each GOP is determined based on the following formula.

$$Ngop/R = Ngop - Ne \qquad \text{Math. 1}$$

(with R beplay speed)

Preferably, removal of B-pictures from the original file is accomplished so that the intervals between the removed pictures are as uniform as possible along with the picture sequence in the original file. By doing so, deterioration of image quality during reproduction is prevented. Therefore, the generation unit 105a preferably removes a B-picture at every "S" picture in the sequence of the pictures in the original file. Here, the number "S" indicates a skip number which can be calculated based on the number of pictures to be removed "Ne." The skip number "S" can be calculated according to the following formula:

$$S = Ngop/Ne \qquad \text{Math. 2}$$

After removing B-pictures, a new display number is assigned to each picture remaining in the file. Display numbers in each GOP are serial numbers starting from zero.

(b) Read-Out Unit

The read-out unit 105b reads out a file from the HDD 102 that corresponds to a stream ID and a reproduction mode requested from the reproduction apparatus 20. The file is read-out from a read-out address designated by the switching unit 105d. The read-out unit 105b switches the files to be read-out from the current file to a next file upon receiving an instruction of reading-out the next file along with a read-out address thereof while reading-out the current file. In other words, the read-out unit 105b stops reading-out the current file and starts reading-out the next file from the designated read-out address.

(c) Request Acceptance Unit

The request acceptance unit 105c receives a transmission request and a mode switching request from the reproduction apparatus 20. The transmission request and the mode switching request include at least a communication address of a sender, a stream ID, and a reproduction mode. The reproduction mode is either a normal mode or a fast-forward mode in this embodiment.

(d) Switching Unit (d-1) A Notification of Read-Out Address of a File

The switching unit 105d determines the file to be read-out upon the transmission request from the reproduction unit 20, and notifies the head address of a file to the read-out unit 105b. The transmission request from the reproduction apparatus 20 includes at least a stream ID and a reproduction mode.

The switching unit 105d determines the file to be read-out next upon receiving the mode switching request, and notifies the read-out unit 105b of a read-out address of a next file to be read-out next. This notification is performed while a current file is being read-out. The mode switching request from the reproduction apparatus 20 includes at least a stream ID and a reproduction mode.

(d-2) Determination of Switching Position of Files

The switching unit 105d determines the switching positions of files. The switching unit 105d preferably determines two I-pictures in the current file and the next file as switching positions. The two I-pictures are identical with each other and are arranged in the current file and the next file respectively. Switching at these two corresponding I-pictures facilitates smoother playback when switching the reproduction modes. This is because each I-picture is decoded independently and the decoded data of an I-picture in a file is identical with the decoded data of the corresponding I-picture in another file. For example, in FIG. 5, when a fast-forward mode is requested after reading-out and transmission of the P7-picture in the original file, the I1-pictures in both the original and fast-forward files of the next GOPs (GOP2s) are determined as switching positions. These I1-pictures are I-pictures to be read-out after the P7-pictures in both files. Here it should be noted that the B9-, P10-, B11-pictures arranged in both files and read-out after the P7-pictures are not determined as switching positions.

The switching position in the current file is preferably a first I-picture to be read-out after receiving the mode switching request so that there would be a minimal lag between the receptions of the mode switching request. The switching position in the next file is a corresponding I-picture which is identical to the I-picture of the switching point in the current file. Again, using FIG. 5 as an example, when a fast-forward mode is requested after reading-out the B2-picture in the original file, the I1-picture in GOP2 will be determined as a switching position in the current file. The I1-picture is the first I-picture to be read-out after the B2-picture.

(d-3) Calculation of a Read-Out Address

A reading-out position of the next file is calculated based on the calculated switching position of the current file. Another switching position of the next file, namely the address, is obtained from the offset table. The switching unit 105d reads out the relative address of the I-picture in the next file from the offset table. Here, the I-picture in the next file is identical to the I-picture in the current file which also is the switching position in the current file. The reading address of the next file is calculated based on the relative address that has been read-out and the head address of the next file. The I-pictures of both switching positions can be read-out from either one of the current file or the next file. The method of obtaining the relative address of an I-picture based on the offset table has an advantage of conserving memory space for storing the fast-forward file as compared with a method of using dummy data, which is described below.

(2) The Reproduction Apparatus

Figure 8:
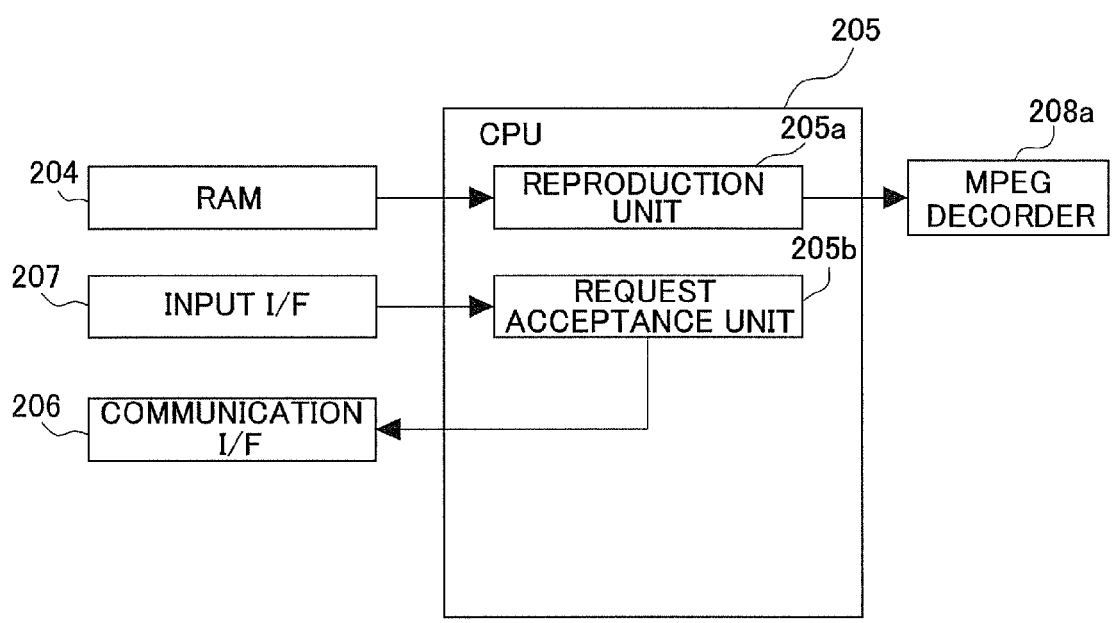
FIG. 8 shows a simplified block diagram of a functional structure of the reproduction apparatus in FIG. 1.

FIG. 8 shows a functional block diagram of the reproduction apparatus 20. The CPU 205 of the reproduction apparatus 20 enables the reproduction apparatus 20 to operate as a reproduction unit 205a and a request acceptance unit 205b, which are explained below.

(a) The Reproduction Unit

The reproduction unit 205a sends a command requesting the reproduction of an encoded stream from the transmission server 10 to the MPEG decoder 208a. The MPEG decoder 208a then starts decoding and reproducing pictures from the communication interface 206 one after another upon receiving the command, and stops decoding and reproduction upon receiving a "stop" command. The reproduction unit 205a may also send a command to the MPEG decoder 208a requesting the decoded data that has been read-out from a removable disk in the drive 201 or from the HDD 202. This enables the reproduction apparatus 20 to playback encoded data recorded on the removable disk or the HDD 202.

(b) The Request Acceptance Unit

The request acceptance unit 205b accepts designation of stream ID and reproduction mode via the input interface 207, and sends the designated stream ID and reproduction mode to the transmission server 10.

Process

Hereinafter, an explanation of the process executed in the reproduction system 100 will be given using FIGS. 9-11.

<1> Processes by the Transmission Server

The transmission server 10 executes at least a transmission process. In this embodiment, the transmission server 10 also executes a data generation process. It should be noted that the file generation process may be executed not only on the transmission server 10 but also on another computer terminal.

<1-1> A Data Generation Process

Figure 9:
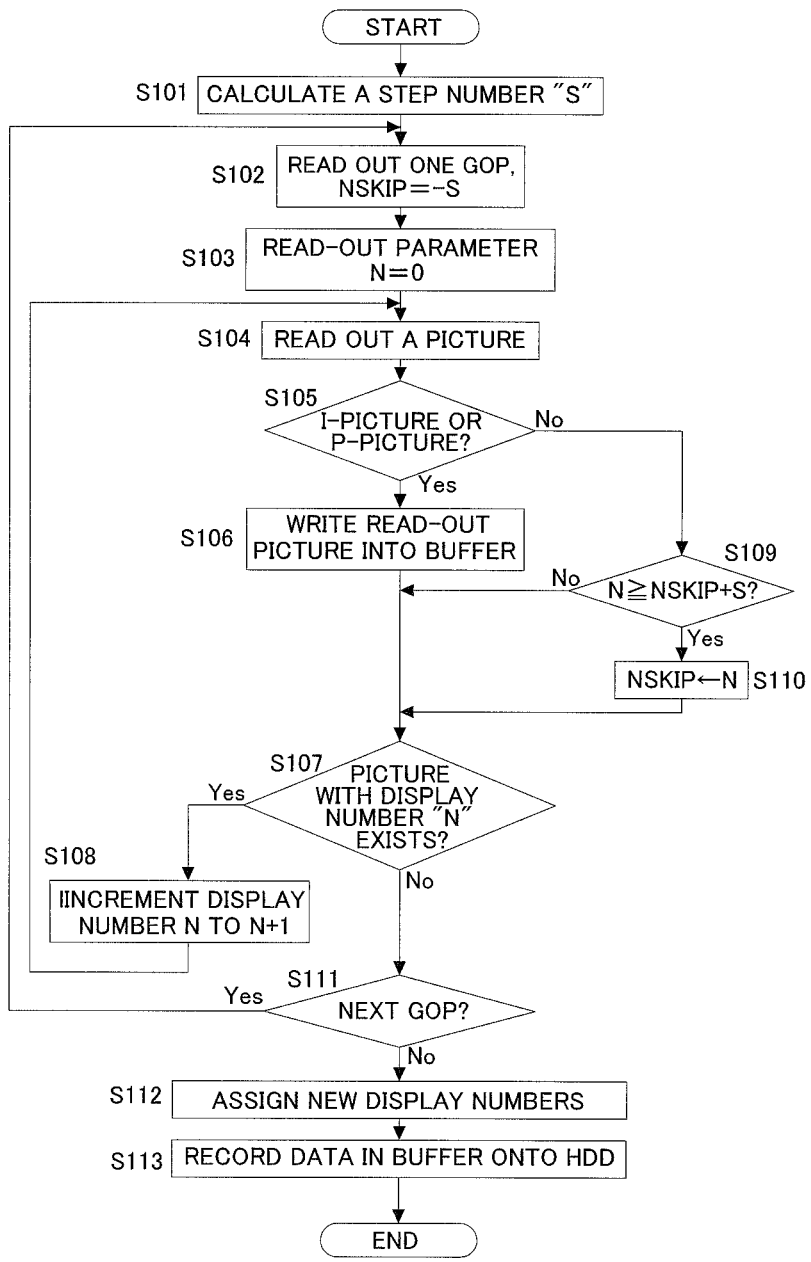
FIG. 9 shows a flowchart illustrating an inventive method for generating a trick-play data file executed by the transmission server in FIG. 1.

FIG. 9 illustrates a flow chart of an embodiment of the data generation process executed by the CPU 105 in the transmission server 10. This process is to generate fast-forward file. This process may be started upon obtaining new non-encoded AV data or low-compression AV data. This process may also be stared upon obtaining or generating a new original file. In this embodiment, suppose that the CPU 105 generates data for fast-forward reproduction after generating MPEG2 data of an original file and recording the file on the HDD 102.

Step S101: The CPU 105 calculates a step number S. The CPU 105 generates the data for a fast-forward reproduction by removing a picture at every "S" picture. In addition, the CPU 105 executes the following initiation processes where the CPU 105 sets a read-out address of the HDD 102 at the head of the original file. The CPU 105 generates a buffer in a volatile memory such as the RAM 104 so that the data for fast-forward reproduction is temporarily recorded during the data generation process.

Step S102: The CPU 105 reads out the data of one GOP from the original file. Such read-out GOP is called "current GOP" hereinafter. The CPU 105 sets an initial value of the skip number "Nskip" at "−S". The skip number "Nskip" indicates the display number of the picture which is last removed among the pictures in the current GOP.

Step S103: The CPU 105 initiates a read-out parameter and sets its value "N" to "0". The value of the read-out parameter "N" indicates a display number of a picture to be read-out next. The read-out parameter is used in the following steps to determine which picture should be removed or not.

Step S104: The CPU 105 reads out a picture with display number "N" from the RAM 104.

Step S105: The CPU 105 determines whether the read-out picture is an I-picture or P-picture.

Step S106: If an I-picture or P-picture is being read-out, the CPU 105 writes the read-out picture into the buffer generated in step S101 since B-pictures are to be removed in this embodiment. In a case where the read-out picture is a picture other than an I- or P-picture, namely a B-picture, the process jumps to step S109 described below.

Step S107: The CPU 105 determines whether a picture with the display number "N+1" exists in the current GOP by referring to the RAM 104.

Step S108: If a picture with the display number "N+1" exists in the current GOP, the CPU 105 increments the value of the read-out parameter "N" to "N+1" and reads-out a picture having a display number that is "N+1" (S104). If a picture with the display number "N+1" does not exist in the current GOP, the process jumps to Step S111 below.

Step S109: The CPU 105 determines whether a formula mentioned below is met when a B-picture is being read-out. In other words, the CPU 105 determines whether the difference in the display numbers between a last removed B-picture and the B-picture just being read-out is equal to or larger than the skip number "S".

$$N >= Nskip + S \qquad \text{Math. 3}$$

Step S110: When the above mentioned formula is met, the CPU 105 reads out a next picture without writing the B-picture onto the buffer. The CPU 105 sets the value of skip number "Nskip" to the value "N" of the current display number (Nskip<−−N). Afterwards, the process jumps to the step S107. In this way, a B-picture is removed from the original file at every "S" picture in a display order.

Step S111: The CPU 105 determines whether the next GOP exists or not by referring to the address that is one GOP ahead. If the next GOP is found, the CPU 105 executes the above mentioned steps S102-S110 for the next GOP. If the next GOP does not exist, it means that the B-pictures were removed from all of the GOPs in the original file. The process then jumps to step S112.

Step S112: The CPU 105 assigns new display numbers to every picture in each GOP. The display numbers are assigned serially starting from "0" in each GOP.

Step S113: The CPU 105 records the data stored in the buffer for the fast-forward reproduction onto the HDD 102 whereby the fast-forward file data and the original file data are stored correlatively. The CPU 105 writes the name of the original file data and the name of the fast-forward file data into the stream table. The CPU 105 also writes the addresses of I-pictures in the original file and those of the fast-forward file in the offset table correlatively.

<1-2> A Transmission Process

Figure 10:
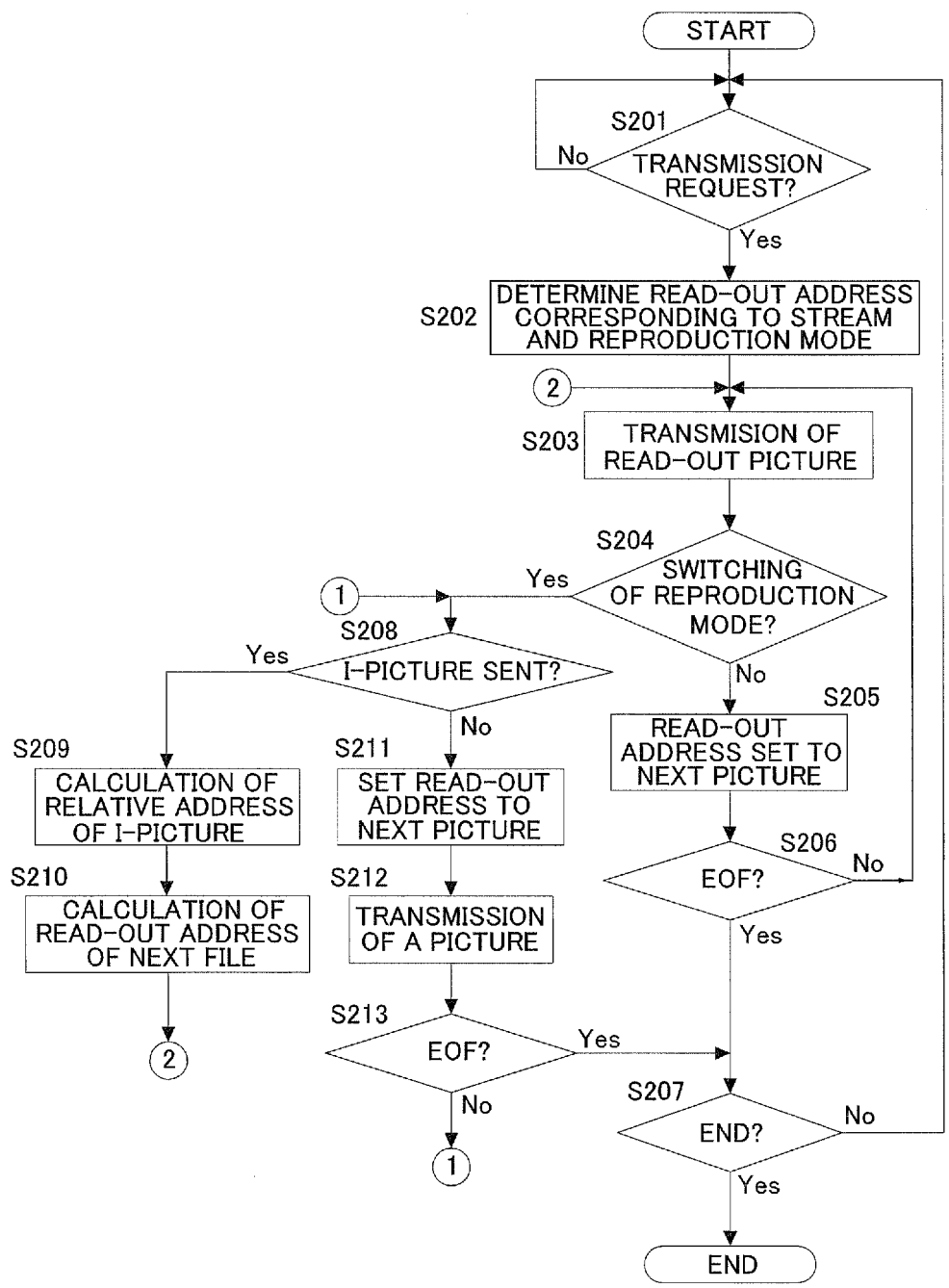
FIG. 10 shows a flowchart illustrating an inventive method for reading-out and transmitting data files executed by the transmission server in FIG. 1.

FIG. 10 illustrates a flow chart of the transmission process executed by the CPU 105 in the transmission server 10. This process is initiated by the starting of the transmission server 10.

Step S201: The CPU 105 waits for the transmission request from the reproduction apparatus 20 and jumps to step S202 upon receiving such transmission request. The transmission request includes a stream ID and a reproduction mode.

Step S202: The CPU 105 determines the head address of a file corresponding to the requested stream ID and reproduction mode as the read-out address by referring to the stream table. Concretely, the CPU 105 sends a request to Operation System (OS) to read out the file from its file head.

Step S203: The CPU 105 starts reading-out and transmits pictures from the read-out address. The CPU 105 reads out one picture from the read-out address, and transmits such picture to the reproduction apparatus 20 via the communication interface 106.

Step S204: The CPU 105 determines whether the transmission server 10 received a mode switching request from the reproduction apparatus 20. If the transmission server 10 has received a mode switching request, the process jumps to step S208 described below.

Step S205: If there is no mode switching request, the CPU 105 will read-out from the address that is one picture ahead.

Step S206: The CPU 105 determines whether the new read-out address indicates the end of file (hereinafter "EOF").

Step S207: If the new read-out address indicates an EOF, the CPU 105 determines if this process should end or not. The process will terminate in a case such as when the transmission server 10 is turned off. The CPU 105 waits for the next transmission request if the new read-out address indicates EOF.

Step S208: The CPU 105 determines whether the latest picture sent out is an I-picture when the transmission server receives a mode switching request. In other words, the CPU 105 determines whether the picture transmitted in the step S203 was an I-picture or not.

Step S209: When the picture was an I-picture, the CPU 105 calculates a relative address of the current read-out address which is relative to the head address of the current file. "The current read-out address" hereby is an address of the I-picture transmitted in the step S203.

Step S210: The CPU 105 reads out a new relative address from the offset table according to the current reproduction mode, the calculated relative address in the step S209, and the newly requested reproduction mode. The CPU 105 calculates a read-out address in a file to be reproduced next, based on the read-out new relative address. The read-out address in the file to be read-out next for reproduction is an initial address of the picture next to the I-picture identical to the I-picture transmitted in the step S203. In addition, the CPU 105 requests OS to read out the next file. Concretely, the CPU 105 sends a read-out request of the file to OS together with a file name corresponding to the requested reproduction mode and the calculated read-out address. The process then returns to step S203 and the CPU 105 reads out and transmits the pictures from the read-out address one after another.

Step S211: The CPU 105 sets the read-out address to the head address of the next picture when the latest transmitted picture was not an I-picture.

Step S212-213: The CPU 105 proceeds to read-out and transmit the next picture until the end of the file. The CPU 105 determines whether the transmitted picture was an I-picture or not when a picture was transmitted to the reproduction apparatus 20 (S208). If the transmitted picture was an I-picture, the CPU 105 calculates the read-out address of a file to be read-out next (S209-S210). Accordingly, the read-out address of the next stream data is the head address of a picture next to an I-picture which is a next I-picture to the transmitted I-picture.

This process enables the transmission server 10 to transmit a video data stream which is requested by the reproduction apparatus 20. The transmission server 10 reads out and transmits a file corresponding to the next reproduction mode when it receives a mode switching request during the transmission of another file. The transmission server 10 then switches the files at an I-picture in the current file between an I-picture in the next file. In this embodiment, the next file is read-out from the head address of a picture which is next to an I-picture. This switching effectively prevents deterioration of image quality when the files are switched.

<2> A Process Executed by Reproduction Apparatus

Figure 11:
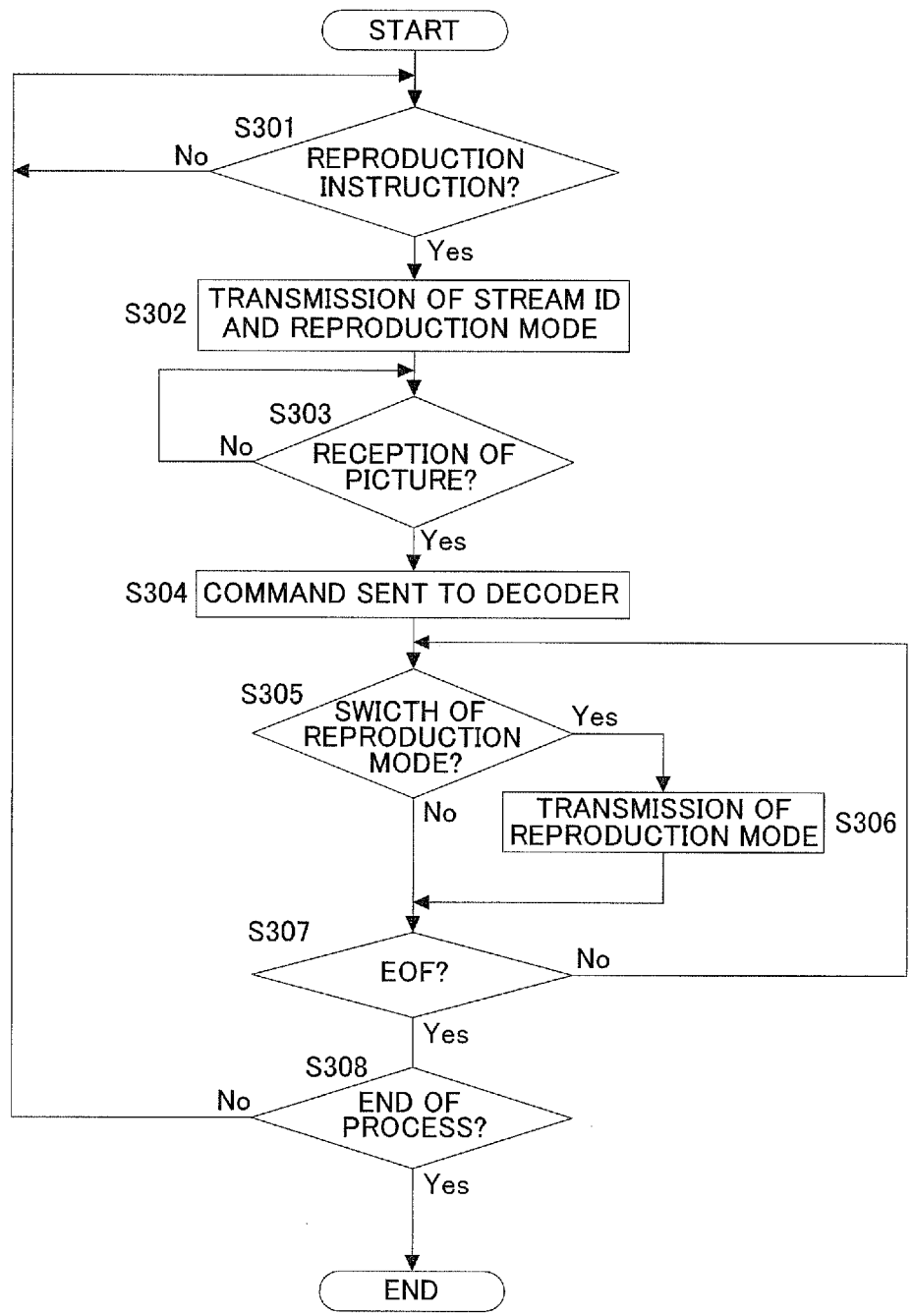
FIG. 11 shows a flowchart illustrating a method for reproducing data executed by the reproduction apparatus in FIG. 1.

FIG. 11 illustrates a flow chart of a process executed by the CPU 205 in the reproduction apparatus 20. This process is initiated by switching on the reproduction apparatus 20.

Step S301: The CPU 205 waits for a reproduction instruction from the input interface 207. This process jumps to step S302 upon the reproduction instruction. The reproduction instruction includes a stream ID and a reproduction mode.

Step S302: The CPU 205 transmits a transmission request to the transmission server 10 via the communication interface 206. The transmission request includes the input stream ID and the reproduction mode.

Step S303-S304: The CPU 205 waits for pictures from the transmission server 10 (S303), and sends a command to the MPEG decoder 208a to decode pictures received via the communication interface 206 (S304). The MPEG decoder 208a decodes the received pictures in a stream identified by the stream ID in receiving order upon the command from the CPU 205. The decoded pictures are used to output images on the LCD 22 in display order.

Step S305-S306: The CPU 205 receives a mode switching request at any time (S305), and transmits the mode switching request to the transmission server 10 via the communication interface (S306). Pictures of a next file will be sent from the transmission server 10 upon this mode switching request. These pictures in the next file are also decoded by MPEG decoder 208a in a similar way for decoding pictures arranged in the previous file which was being decoded before the mode switching instruction.

Step S307: The CPU 205 watches whether an EOF is sent from the transmission server 10. The CPU 205 receives a mode switching instruction until receipt of an EOF (S305). Upon the reception of EOF, a command is sent to the MPEG decoder 208a to stop the decoding, and to move onto step S308.

Step S308: The CPU 205 determines if this process should end upon the reception of EOF. For example, this process is terminated when the reproduction apparatus 20 is switched off. The CPU 205 waits for the next reproduction instruction during this process.

This process also enables the reproduction apparatus 20 to output images based on the file from the transmission server 10. The reproduction apparatus 20 transmits a mode switching request to the transmission server 10 upon the acceptance of a mode switching instruction during reception of the file. The files from the transmission server 10 are switched from one to another corresponding to the reproduction mode designated by the mode switching request. Accordingly, the reproduction apparatus 20 can realize a switching of reproduction modes based on the mode switching instruction by reproducing the pictures from the transmission server 10 one after another.

In this embodiment, a mode switching request is transmitted from the reproduction apparatus 20 to the transmission server 10, and switches files to be transmitted from the transmission server 10. Decoding and outputting the pictures received from the transmission server 10 can realize a switching of reproduction modes in playback on the reproduction apparatus 20.

The Second Embodiment

In this embodiment, encoded data files are stored in the reproduction apparatus 50. The reproduction apparatus 50 switches reproduction modes by switching files to be read-out from a storage medium. Examples of the storage medium are a hard disk in the reproduction apparatus 50 and a removable storage medium. In order to simplify the explanation, the reproduction apparatus 50 reads out encoded data files from the hard disk in this embodiment.

Hardware Configuration

Figure 12:
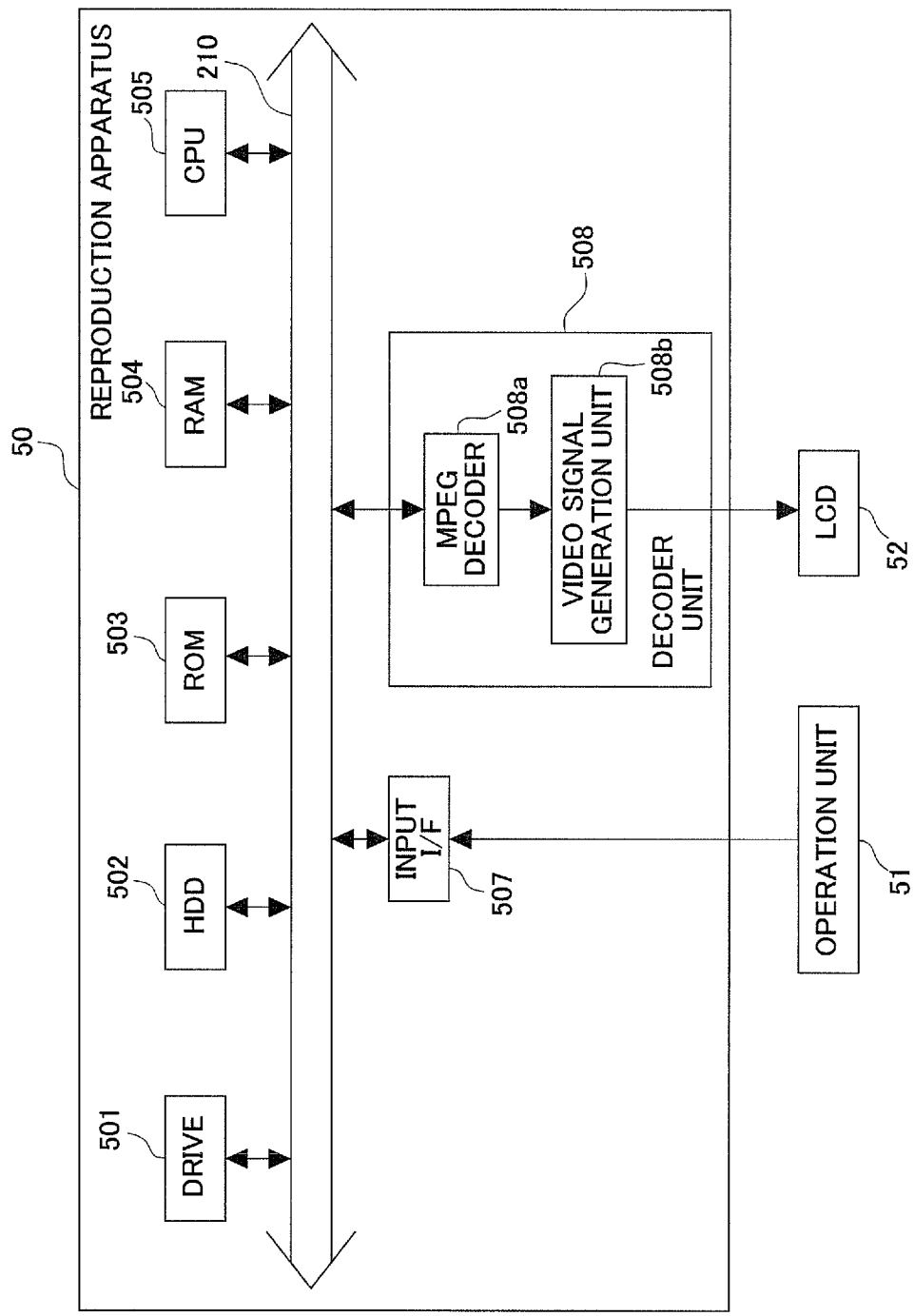
FIG. 12 shows a simplified block diagram of a hardware structure of a reproduction apparatus in a second embodiment.

FIG. 12 illustrates a hardware diagram of a reproduction apparatus 50. In this embodiment, the reproduction apparatus 50 includes a drive 501, an HDD 502, a ROM 503, a RAM 504, a CPU 505, a communication interface 506, an input interface 507, a decoder unit 508, and a BUS 510 that connects the above mentioned elements. The elements having the same functions as those of the reproduction apparatus 20 in the first embodiment are illustrated with the same names for the reproduction apparatus 50.

The drive 501 reads out encoded data files from a removable storage medium such as an optical disk. The drive 501 is an optional element for the reproduction apparatus 50.

The HDD 502 stores a plurality of encoded video data files and preferably a plurality of voice data files for each AV content.

The ROM 503 stores control programs and data necessary for executing a control program.

The RAM 504 temporarily stores the data necessary for executing the control program.

The CPU 505 manages the entire operation of the reproduction apparatus 50 by executing the control program stored in the ROM 503 on a volatile memory such as the RAM 504. For example, the CPU 505 manages the communication interface 506 so that it receives an encoded data stream from the transmission server 10, and outputs the received stream to the decoder unit 508 via the BUS 510.

The input interface 507 accepts a user operation on an operation unit 51 such as a keyboard and a mouse. An operation signal is output to the CPU 505 via the BUS 510.

The decoder unit 508 includes an MPEG decoder 508a and a video signal generation unit 508b. The MPEG decoder 508a decodes MPEG format encoded data that is input through the BUS 510 in response to a command from the CPU 505, and generates digital video data. The generated digital video data is output to the video signal generation unit 508b. The video signal generation unit 508b converts the digital video data into display data so that the display data can correspond with the number of pixels of a LCD 52. The generated display data is then output to the LCD 52 by a LCD driver (not shown).

Functional Configuration

Figure 13:
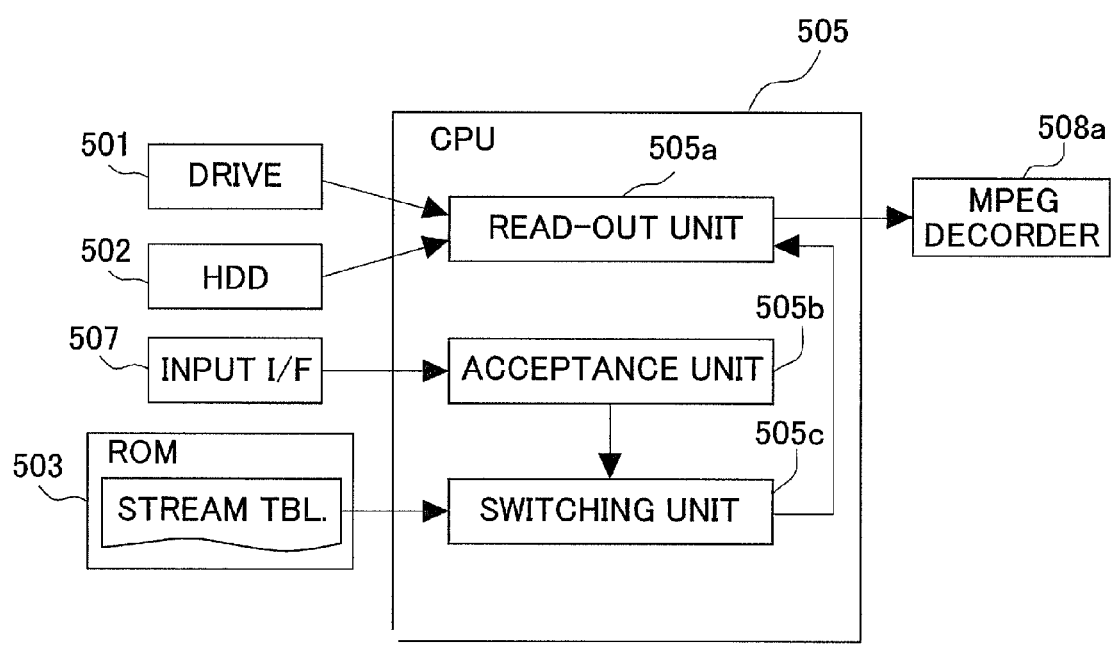
FIG. 13 shows a simplified block diagram of a functional structure of the reproduction apparatus in FIG. 12.

FIG. 13 illustrates a functional diagram of the reproduction apparatus 50. The CPU 505 in the reproduction apparatus 50 enables the reproduction apparatus 50 to operate as a read-out unit 505a, an acceptance unit 505b, and a switching unit 505c. The structure of a fast-forward file will be explained first, and then each function of the reproduction apparatus 50. The ROM 503 in the reproduction apparatus 50 stores the stream table mentioned in the first embodiment, this stream table stores similar data to those explained in the first embodiment.

(a) A Fast-Forward File (a-1) Configuration

Figure 14A:
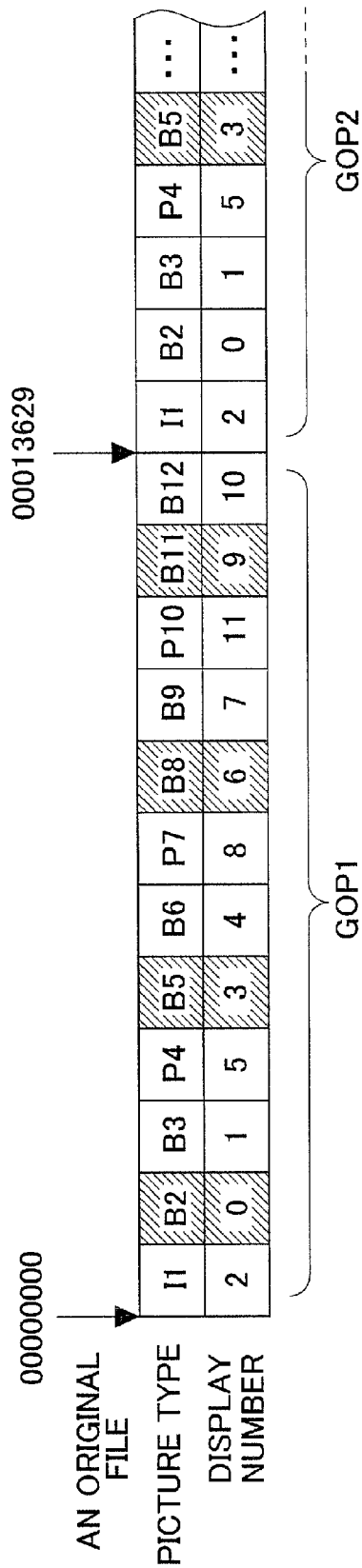
FIG. 14A shows an explanatory view of an original file.
Figure 14B:
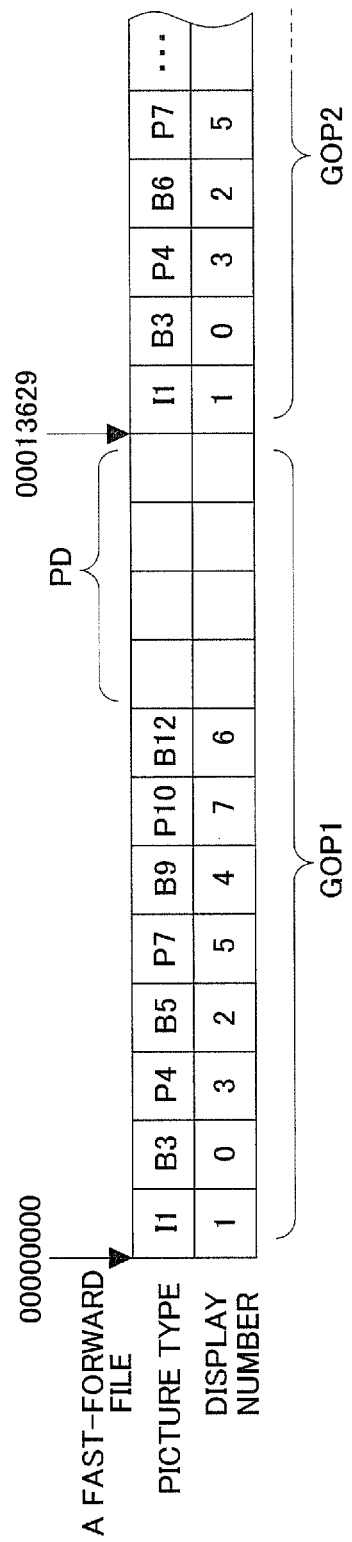
FIG. 14B shows an explanation view of a fast-forward file derived from the original file illustrated in FIG. 14A.

FIG. 14A is an explanatory view of an original file. FIG. 14B is an explanatory view of a fast-forward file which is derived from the original file illustrated in FIG. 14A. The original file and the fast-forward file are stored in a storage medium such as a removable storage medium or a hard disk. The fast-forward file in this embodiment is the same as the fast-forward file described in the first embodiment in a sense that they both are generated by removing some pictures in the closed-GOP-type or open-GOP-type original file. The difference in a fast-forward file between this embodiment and the first embodiment is whether or not the relative addresses of I-pictures arranged in each GOP are the same between an original file and a fast-forward file. This is because dummy data having the same amount of data as a removed picture is inserted into a fast-forward file of this embodiment.

FIG. 14B illustrates the fast-forward file generated by removing four pictures from each GOP in the original file. In addition, the fast-forward file has dummy data "PD" whose data amount is identical to that of four removed pictures.

This fast-forward file has the following advantages. This fast-forward file enables the omission of the offset table shown in the first embodiment because the relative addresses of I-pictures in different files are the same as long as they correspond to a same AV content. Therefore, the read-out address of a next file can be calculated based on a relative address of an I-picture, which is a switching position in a current file, and the head address of the next file stored in the stream table. The relative address is an address relative to the head of a file as mentioned in the first embodiment.

(a-2) Generation of a Fast-Forward File

The generation of the above-mentioned fast-forward file can be performed by the generation unit 105a in the transmission server 10 explained in the first embodiment. The generation unit 105a generates a fast-forward file with dummy data by executing the following additional steps (not shown) in addition to the steps illustrated in the flowchart in FIG. 9.

An additional step counts and stores the total number of times it determines "yes" in step S109 for each GOP. Concretely, this process counts and stores the number of pictures removed from each GOP in the original file. A parameter "Pr" is newly adopted in this modified flowchart in order to indicate the number of removed pictures. The parameter Pr is initialized to 0 in step S102, and is incremented in another additional step. This step of incrementing the value of parameter "Pr" is executed by the generation unit 105a after determining "yes" at step S109 and before jumping to step S107.

Dummy data, which has the same amount of data as removed "Pr" pictures, is written into the buffer (step S107a, not shown). This step S107a is executed after step S107 and before step S111. The dummy data is written into the buffer after the removing process for each GOP is completed. Accordingly, dummy data having the same amount of data as removed pictures is consecutively arranged after the remaining pictures of each GOP in the buffer.

(b) Read-Out Unit

The read-out unit 505a reads out a file from the HDD 502 which corresponds to a stream ID and a reproduction mode provided by the input interface 507. The file is read-out from a read-out address designated by the switching unit 505c. The read-out unit 505a switches the files to be read-out from a current file to a next file upon receiving an instruction of reading-out the next file along with a read-out address thereof, while reading-out the current file. In other words, the read-out unit 505a stops reading-out the current file and starts reading-out the next file from the designated read-out address.

(c) Acceptance Unit

The acceptance unit 505b accepts the designation of a stream ID and a reproduction mode via the input interface

507. The acceptance unit 505*b* notifies the switching unit 505*c* of the designated stream ID and the reproduction mode.

(d) Switching Unit (d-1) Notification of Read-Out Address

The switching unit 505*c* determines a file to be read-out based on the stream ID and the reproduction mode notified from the acceptance unit 505*b*. The switching unit 505*c* notifies the read-out unit 505*a* of the head address of the file to be read-out.

The switching unit 505*c* also determines a next file and its read-out address based upon the stream ID and the reproduction mode accepted by the acceptance unit 505*b* while a current file is being read-out. The next file and its read-out address are notified to the read-out unit 505*a*.

(d-2) The Switching Position of the Files

The switching unit 505*c* determines the switching positions of the current and next files. The switching unit 505*c* will determine two I-pictures in the current file and the next file as switching positions. The two I-pictures are identical to each other, and are arranged in the current file and the next file respectively. The switching position in the current file is preferably a first I-picture to be read-out from the current file after accepting the mode switching instruction. The switching position in the next file is a corresponding I-picture which is identical to the I-picture of the switching position in the current file. The relative address of the I-pictures of the switching positions in the current and the next files are identical.

(d-3) Calculation of the Read-Out Address

The switching unit 505*c* calculates the read-out address of the next file based on the determined switching positions. The read-out address of the next file may be calculated by adding the relative address of the I-picture of the switching position in the next file and the head address of the next file.

Process

Figure 15:
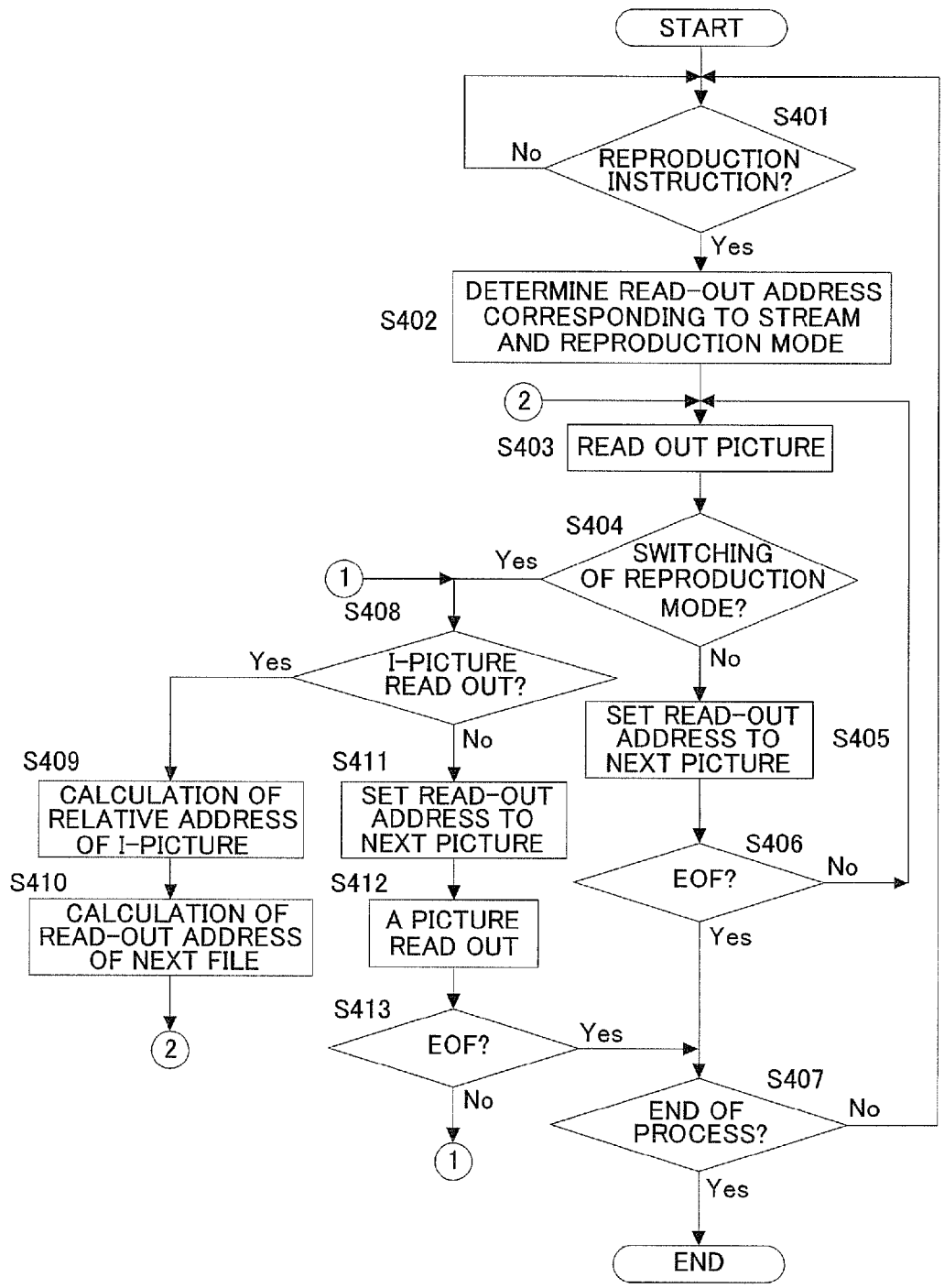
FIG. 15 shows a flowchart illustrating an inventive method for reading-out and reproducing data executed by the reproduction apparatus in FIG. 12.

FIG. 15 illustrates a flowchart of a reproduction process executed by the CPU 505 in the reproduction apparatus 50. This process is initiated, for example, by turning on the reproduction apparatus 50.

Step S401: The CPU 505 waits for a reproduction instruction from the input interface 507. The process jumps to step S402 upon receiving the reproduction instruction. The reproduction instruction includes at least one stream ID and a reproduction mode.

Step S402: The CPU 505 reads out a name of an encoded file from the stream table based on the stream ID and the reproduction mode accepted in the step S401.

Step S403: The CPU 505 starts reading-out pictures from the file identified by the file name that is read out from the stream table in the step S402. The CPU 505 also sends a command to the MPEG decoder 508*a* which instructs the start of decoding. The MPEG decoder 508*a* then starts decoding the read-out pictures in the order of them being read-out upon receiving the command. The decoded pictures are used to produce images on the LCD 52 in the order of display according to the display numbers.

Step S404-S405: The CPU 505 determines whether a mode switching instruction is input (S404). If there is no mode switching request, the CPU 505 will read-out from the address that is one picture ahead. If the CPU 505 receives the mode switching instruction, this process jumps to the step S408 mentioned below.

Step S406-S407: The CPU 505 determines whether the new read-out address indicates the end of file EOF (S406). If the new read-out address indicates EOF, the CPU 505 determines whether this process should end or not (S407). If this process should continue, this process returns to step S401 to wait for the next reproduction instruction. This process will terminate, for example, in a case such as when the reproduction apparatus 50 is turned off.

Step S408-S409: When the mode switching instruction is input, the CPU 505 determines whether the latest read-out picture was an I-picture (S408). In other words, the CPU 505 determines whether an I-picture was read-out and decoded in the step S403. If that is the case, the CPU 505 calculates a relative address of the current read-out address which is relative to the head address of the current file (S409). The "current read-out address" is the address of the I-picture read-out in the step S403.

Step S410: The CPU 505 requests OS to read out the next file whose name is read out from the stream table. The read-out address of the next file is the head address of a picture next to the picture whose head address is at the relative address. Then the process returns to step S403, and reading-out and decoding the pictures located at a reading address is performed in one after another.

Step S411-S413: The CPU 505 determines the "head address of the next picture" as a read-out address when the latest read-out picture was not an I-picture (S411). Further, the CPU 505 reiterates reading-out and decoding the next picture until the read-out address reaches to the end of file (S412, S413). The CPU 505 determines whether read-out picture is an I-picture when reading-out a picture (S408). When a read-out picture is an I-picture, the CPU 505 calculates a read-out address of the next file (S409-S410). Therefore, the relative address of the read-out point of the next file is identical with the relative address of the beginning of a picture next to an I-picture which is read-out after an I-picture read-out in step S408.

In this way, the reproduction apparatus 50 switches files to be read-out from a storage medium upon accepting the mode switching instruction, and represents images.

Further Embodiments (A) In the first embodiment mentioned above, the original file and a fast-forward file are stored in the HDD 102. Alternatively, these files may be stored in the removable storage medium. In such a case, the transmission server 10 obtains encoded data files from the removable storage medium or outside resource, and transmits them to the reproduction apparatus 20. A stream table and an offset table are preferably also stored in the same storage medium where encoded data files are stored thereon.

(B) Unlike the first and second embodiments, it is possible to generate a fast-forward file by removing pictures from an original file which are encoded and decoded by referencing preceding frames. For example, a fast-forward file can be generated by removing P-pictures from an MPEG 2 format original file.

A P-picture may be removed when there are no B-pictures proceeding to or subsequent to the P-picture and when it is the last P-picture in a GOP. Accordingly, a P-picture may be removed from a GOP in order of reverse sequence when reproduction at the desired play speed cannot be performed even if all B-pictures are removed in a GOP.

A fast-forward file can be generated likewise from an original file which has no B-pictures. The fast-forward file can be obtained by removing P-pictures from the original file in the order of a reverse sequence.

(C) Unlike the first and second embodiments, a fast-forward file can be generated independently from an original file. The following will consider two cases-firstly, the case when an I-picture is arranged at a fixed position in each GOP in the sequence of pictures, and secondly, the case when an I-picture is generated at random positions in each GOP in the original file.

(C1) Since a CPU manages an encoder so that it arranges an I-picture at the fixed position in each GOP in an original file, it assigns a picture pattern of I, P, and B to an encoder so that reproduction at a designated play speed can be performed and an I-picture can be arranged at the fixed position in each GOP. This enables an encoder to generate an original file and a fast-forward file independently. It is also possible that two encoders generate an original file and a fast-forward file separately.

(C2) In this case, a main encoder, a sub-encoder and an outside circuit are employed in a computer which generates the original and fast-forward files. The main encoder generates the original file (step S601). The sub-encoder generates the fast-forward file. The outside circuit outputs to the sub-encoder time information indicating timing at which the main encoder generates an I-pictures. In addition, the outside circuit removes pictures so that the designated reproduction speed can be realized. The number of pictures to be removed is output from the main encoder to the sub-encoder (step S602). The removed pictures are pictures other than I-pictures encoded by the main encoder. The main encoder preferably notifies the generation of an I-picture to the outside circuit so that the outside circuit can selectively remove pictures. This notification enables generation of an offset table which associates an address of an I-picture in the original file with an address of a corresponding I-picture in a fast-forward file (step S603).

The outside circuit can also input predetermined dummy data into the sub-encoder as it removes pictures. This process enables the relative addresses of I-pictures arranged in each GOP to be identical between an original file and a fast-forward file (step S604).

(D) The present invention encompasses a program for executing the method discussed above on a computer, as well as a computer readable storage medium to which such a program is recorded. The program may be downloadable. Examples of storage medium include a computer readable/writable flexible disk, a hard disk, semi-conductor memory, a CD-ROM, a DVD and a magnet-optic disk (MO).

While only selected embodiments have been chosen to illustrate the present invention, it will be apparent to those skilled in the art from this disclosure that various changes and modifications can be made herein without departing from the scope of the invention defined in depended claims. Furthermore, the detailed descriptions of the embodiments according to the present invention provided for illustration only, and not for the purpose of limiting the invention as defined by the present claims and specifications.

INDUSTRIAL APPLICABILITY

The present invention is preferably applied to reproduction of digital video data.

The invention claimed is:

1. A video data reproduction system comprising:
a source storing first and second video data derived from a same video data;
an output node;
a providing unit configured to provide sequentially the first and the second video data to said output node and coupled between said source and said output node; and
a switching unit configured to switch data between the second and the first video data in response to a control signal, and coupled to said providing unit, wherein when a mode switching request has been received, the switching unit determines whether a latest picture provided from the second video data was an intra frame,
wherein when the latest picture provided from the second video data was not an intra frame, the switching unit refrains from switching from the second video data to the first video data and sets a read-out address to a head address of the next picture in the second video data and then determines whether the next picture provided in the second video data is an intra frame,
and when the latest picture provided from the second video data is an intra frame, the switching unit sets switching positions to an intra frame in the second video data and another intra frame in the first data which is identical to the intra frame in the second video data, wherein
the first video data includes intra frames and non-intra frames, the intra frames being decoded independently and the non-intra frames being decoded by referencing preceding and/or subsequent frames and the second video data includes at least the intra frames in the first video data and a subset of the non-intra frames in the first video data, and
the second video data is generated by removing frames from the first video data that are other than intra frames at a fixed frame skipping interval, so that the second video data comprises intra frames and a reduced number of non-intra frames.

2. The video data reproduction system of claim 1, wherein the switching unit sets the switching positions to the first intra frame in the current data that is read-out after the control signal.

3. The video data reproduction system of claim 2, wherein the switching point is set beyond at least one non-intra frame after the data currently read-out in response to the control signal.

4. The video data reproduction system of claim 1, wherein the first video data is for reproduction in a normal mode, and the second video data is for reproduction in a fast-forward mode.

5. The video data reproduction system of claim 1, further comprising an address storage unit configured to store a relation table which correlatively stores addresses of the intra frames in the first and second video data, wherein the switching unit refers to the relation table and determines a read-out address from which the next data is read-out.

6. The video data reproduction system of claim 5, wherein the address storage unit stores a head address of a file for the first video data and a head address for each of a plurality of corresponding fast forward mode files, one of which comprises the second video data.

7. The video data reproduction system of claim 6, wherein the storage unit stores a corresponding play speed for each of the plurality of fast forward mode files.

8. The video data reproduction system of claim 1, wherein every "S" non-intra frame picture of the first video data is removed, wherein S is calculated as S=Ngop/Ne, where Ngop/R =Ngop−Ne, where R is the replay speed and Ne is the number of pictures to be removed from each group of pictures.

9. The video data reproduction system of claim 1, wherein the switching unit is further configured to determine a read-out position of the second video data based on the calculated switching position of a current file.

10. The video data reproduction system of claim 9, wherein the read out address is obtained from an offset table.

11. The video data reproduction system of claim 10, wherein the offset table comprises GOP number information, display number information for intra frames and non-intra frames, original file address information, and fast forward file information.

12. The video data reproduction system of claim 1, wherein the second video data further comprises dummy data inserted such that a relative address of the intra frames of the second video data and the intra frames of the first video data are the same.

13. The video data reproduction system of claim 1, wherein when the last picture provided was an intra frame, the switching unit calculates a relative address of the provided intra frame relative to the head address of the current data and reads out a new relative address from an offset table according to mode switching request, the calculated relative address of the provided intra frame, and the newly requested reproduction mode.

14. The video data reproduction system of claim 1, wherein said switching unit is configured to determine one or more switching points comprising an intra frame of the first video data that is identical to an intra frame of the second video data.

15. The video data reproduction system of claim 1, wherein the second video data includes dummy data that replaces removed intra frames.

16. The video data reproduction system of claim 1, wherein intra frames arranged in the first video data have the same relative addresses as intra frames arranged in the second video data.

17. A video data reproduction system comprising:
a storing means for storing first and second video data derived from a same video data;
an output means;
a providing means for providing sequentially the first and the second video data to said output means, and being coupled between said storing means and said output means; and
a switching means for switching data between the second and the first video data in response to a control signal, and being coupled to said providing means, wherein when a mode switching request has been received, the switching unit determines whether a latest picture provided from the second video data was an intra frame, wherein when the latest picture provided was not an intra frame, the switching unit refrains from switching from the second video data to the first video data and sets a read-out address to a head address of the next picture in the second video data and then determines whether the next picture provided in the second video data is an intra frame, and said switching means sets switching positions to an intra frame in the current data and another intra frame in the next data which is identical to the intra frame in the current data when the latest picture provided from the second video data is an intra frame, wherein
the first video data includes intra frames and non-intra frames, the intra frames being decoded independently and the non-intra frames being decoded by referencing preceding and/or subsequent frames and the second video data includes at least the intra frames in the first video data and a subset of the non-intra frames in the first video data, and
the second video data is generated by removing frames from the first video data that are other than intra frames at a fixed frame skipping interval, so that the second video data comprises intra frames and a reduced number of non-intra frames.

18. A method of video data reproduction system comprising:
storing first and second video data derived from a same video data; an output means;
providing sequentially the first and the second video data to said output means, and being coupled between said storing means and said output means; and
switching data between the second and the first video data in response to a control signal, and being coupled to said providing means, wherein when a mode switching request has been received, the switching unit determines whether a latest picture provided from the second video data was an intra frame, including:
when the latest picture provided was not an intra frame, refraining from switching from the second video data to the first video data and setting a read-out address to a head address of the next picture in the second video data and then determines whether the next picture provided in the second video data is an intra frame; and
when the latest picture provided from the second video data is an intra frame, setting switching positions to an intra frame in the second video data and another intra frame in the first data which is identical to the intra frame in the current data, wherein
the first video data includes intra frames and non-intra frames, the intra frames being decoded independently and the non-intra frames being decoded by referencing preceding and/or subsequent frames and the second video data includes at least the intra frames in the first video data and a subset of the non-intra frames in the first video data, and
the second video data is generated by removing frames from the first video data that are other than intra frames at a fixed frame skipping interval, so that the second video data comprises intra frames and a reduced number of non-intra frames.

19. The method of claim 18, wherein when the last picture provided was an intra frame, the method further comprising:
calculating a relative address of the provided intra frame relative to the head address of the current data and reads out a new relative address from an offset table according to mode switching request, the calculated relative address of the provided intra frame, and the newly requested reproduction mode.

20. The method of claim 18, wherein the first video data is for reproduction in a normal mode, and the second video data is for reproduction in a fast-forward mode.

21. The method of claim 18, further comprising:
storing a relation table which correlatively stores addresses of the intra frames in the first and second video data, wherein the switching includes referring to the relation table and determining a read-out address from which the next data is read-out.

22. The method of claim 21, wherein the address storage unit stores a head address of a file for the first video data and a head address for each of a plurality of corresponding fast forward mode files, one of which comprises the second video data.

23. The method of claim 22, wherein a corresponding play speed is stored for each of the plurality of fast forward mode files.

24. The method of claim 18, wherein a switching point is set beyond at least one non-intra frame after the data currently read-out in response to the control signal.

25. The method of claim 18, wherein every "S" non-intra frame picture of the first video data is removed, wherein S is calculated as S=Ngop/Ne, where Ngop/R=Ngop−Ne, where R is the replay speed and Ne is the number of pictures to be removed from each group of pictures.

26. The method of claim 18, further comprising:
determining a read-out position of the second video data based on the calculated switching position of a current file.

27. The method of claim 26, wherein the read out address is obtained from an offset table.

28. The method of claim 27, wherein the offset table comprises GOP number information, display number information for intra frames and non-intra frames, original file address information, and fast forward file information.

29. The method of claim 18, wherein the second video data further comprises dummy data inserted such that a relative address of the intra frames of the second video data and the intra frames of the first video data are the same.

30. The method of claim 18, wherein one or more switching points are determined comprising an intra frame of the first video data that is identical to an intra frame of the second video data.

31. The method of claim 18, the second video data includes dummy data that replaces removed intra frames.

32. The method of claim 18, wherein intra frames arranged in the first video data have the same relative addresses as intra frames arranged in the second video data.

* * * * *